(12) United States Patent
Hou et al.

(10) Patent No.: US 10,848,998 B2
(45) Date of Patent: Nov. 24, 2020

(54) WIRELESS-COMMUNICATION ELECTRONIC DEVICE AND METHOD

(71) Applicant: Sony Corporation, Tokyo (JP)

(72) Inventors: Yanzhao Hou, Beijing (CN); Shiyu Zhang, Beijing (CN); Xin Guo, Beijing (CN); Yanyan Lu, Beijing (CN); Zhaoqi Peng, Beijing (CN); Xiaofeng Tao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/314,668

(22) PCT Filed: Jul. 21, 2017

(86) PCT No.: PCT/CN2017/093805
§ 371 (c)(1),
(2) Date: Jan. 1, 2019

(87) PCT Pub. No.: WO2018/028415
PCT Pub. Date: Feb. 15, 2018

(65) Prior Publication Data
US 2019/0335348 A1 Oct. 31, 2019

(30) Foreign Application Priority Data
Aug. 10, 2016 (CN) .......................... 2016 1 0653477

(51) Int. Cl.
*H04W 24/08* (2009.01)
*H04W 4/40* (2018.01)
(Continued)

(52) U.S. Cl.
CPC ............. *H04W 24/08* (2013.01); *H04W 4/06* (2013.01); *H04W 4/40* (2018.02); *H04W 24/10* (2013.01)

(58) Field of Classification Search
CPC .......... H04L 2012/5608; H04W 84/12; H04W 88/08; H04W 80/04; H04W 88/06;
(Continued)

(56) References Cited

U.S. PATENT DOCUMENTS

| | | | |
|---|---|---|---|
| 2011/0306353 A1* | 12/2011 | Kim | ...................... H04W 48/18 455/452.2 |
| 2015/0124686 A1 | 5/2015 | Zhang et al. | |

(Continued)

FOREIGN PATENT DOCUMENTS

| | | | |
|---|---|---|---|
| CN | 101351975 A | 1/2009 | |
| CN | 102754487 A | 10/2012 | |

(Continued)

OTHER PUBLICATIONS

Extended European Search Report dated Jun. 19, 2019, issued in corresponding European Application No. 17838545.6, 11 pages.

(Continued)

*Primary Examiner* — Brenda H Pham
(74) *Attorney, Agent, or Firm* — Xsensus LLP

(57) ABSTRACT

Disclosed are a wireless-communication electronic device and method. The electronic device of a user equipment terminal comprises a processing circuit, said processing circuit being configured to: measure the downlink channel quality of a serving base station and adjacent base station of a user equipment; on the basis of the measured downlink channel quality, determine a first base station set from the serving base station and adjacent base station, the first base station set representing a base station set that is to broadcast or multicast data and information. According to the embodiments of the present disclosure, even if location information is unusable, it is still possible to quickly determine a multicast/broadcast base station, while signaling overhead is also reduced.

17 Claims, 15 Drawing Sheets

(51) Int. Cl.
*H04W 4/06* (2009.01)
*H04W 24/10* (2009.01)

(58) Field of Classification Search
CPC ..... H04W 84/18; H04W 74/08; H04W 36/18; H04W 36/0011; H04W 36/14; H04W 36/08; H04W 24/08; H04W 4/40; H04W 4/06; H04W 24/10
USPC .............................. 370/310.2, 328, 338, 331
See application file for complete search history.

(56) References Cited

U.S. PATENT DOCUMENTS

2018/0152807 A1* 5/2018 Van Phan ............. H04W 76/14
2019/0357112 A1* 11/2019 Shen .................... H04W 36/32

FOREIGN PATENT DOCUMENTS

| CN | 103781198 A | 5/2014 |
| EP | 2822195 A1 | 1/2015 |
| KR | 101262326 B1 | 5/2013 |
| WO | 2014048486 A1 | 4/2014 |

OTHER PUBLICATIONS

International Search Report dated Oct. 11, 2017 for PCT/CN20171093805 filed on Jul. 21, 2017, 10 pages including English translation.

* cited by examiner

WIRELESS-COMMUNICATION ELECTRONIC DEVICE AND METHOD

CROSS-REFERENCE TO RELATED APPLICATIONS

The present application is a National Stage Application based on International Application No. PCT/CN2017/093805, filed on 21 Jul. 2017, and claims the priority of Chinese Patent Application No. 201610653477.9, entitled "WIRELESS COMMUNICATION ELECTRONIC DEVICE AND METHOD" filed with the China Patent Office on Aug. 10, 2016, which is incorporated herein by reference in its entirety.

The present application claims the priority of Chinese Patent Application No. 201610653477.9, entitled "WIRELESS COMMUNICATION ELECTRONIC DEVICE AND METHOD" filed with the China Patent Office on Aug. 10, 2016, which is incorporated herein by reference in its entirety.

FIELD OF THE INVENTION

The present disclosure relates to the field of wireless communication, and particularly to the field of vehicle communication (V2X). More particularly, the present disclosure relates to a solution for quickly determining a downlink multicast/broadcast area in V2X communication.

BACKGROUND OF THE INVENTION

In Uu interface based V2X communication, data information (which may also be referred to as V2X message hereinafter) generated by a Transmission Vehicular UE (T-VUE) is sent to a serving base station of the T-VUE via an uplink channel, and upon receipt of the message, the serving base station multicasts/broadcasts the message to an effective area within a certain distance around the T-VUE via a downlink channel. However, since Receiving Vehicular UEs (R-VUEs) within the certain range around the T-VUE are possibly located within different cells, it is possibly necessary to multicast/broadcast the message within a plurality of cells in order to ensure that all the R-VUEs can correctly receive the message.

In the existing related technology, it is general to, by a base station, maintain a corresponding group of R-VUEs and determine a multicast/broadcast area according to positions where the R-VUEs are located. However, this solution requires the base station to dynamically update position information of all the VUEs, thus resulting in greater signaling overhead; moreover, in a case where the position information is unavailable, it is impossible to determine a multicast/broadcast area at this time. Thus, a solution capable of quickly and efficiently spreading a V2X message, which is capable of realizing one or more of the following advantages, is desired: reduced signaling overhead, shortened latency, and efficient transfer of a V2X message.

SUMMARY OF THE INVENTION

A brief summary of the present disclosure is given below to provide a basic understanding of some aspects of the present disclosure. However, it should be understood that the summary is not an exhaustive summary of the present disclosure. It does not intend to define a key or important part of the present disclosure, nor does it intend to limit the scope of the present disclosure. The object of the summary is only to briefly present some concepts of the present disclosure, which serves as a preamble of the more detailed description that follows.

In view of the foregoing problem, an object of at least one aspect of the present disclosure is to provide electronic devices and methods at user equipment end and base station end in wireless communication, which are capable of quickly determining a base station to broadcast or multicast data information from the user equipment, according to downlink channel quality measurement results for surrounding base stations and/or geographical position prediction for the user equipment.

According to an aspect of the present disclosure, there is provided an electronic device at user equipment end in wireless communication, the electronic device comprising a processing circuit configured to: measure downlink channel qualities of a serving base station of the user equipment and neighboring base stations; and determine, based on the measured downlink channel qualities, a first base station set from the serving base station and the neighboring base stations, wherein the first base station set indicates a set of base stations to broadcast or multicast data information.

According to a preferred embodiment of the present disclosure, the wireless communication comprises vehicle communication.

According to another preferred embodiment of the present disclosure, the processing circuit is further configured to determine the first base station set based on variation trends and amplitudes of the measured downlink channel qualities.

According to another preferred embodiment of the present disclosure, the processing circuit is further configured to determine the first base station set based on differential relationship among a first predetermined number of downlink channel qualities, the variation trends of which are increment and the amplitudes of which rank first, and an effective range of the data information.

According to another preferred embodiment of the present disclosure, the processing circuit is further configured to determine the first base station set based further on distances among base stations corresponding to the first predetermined number of downlink channel qualities.

According to another preferred embodiment of the present disclosure, the effective range of the data information is related to at least one of a category of the data information and a movement speed of the user equipment.

According to another preferred embodiment of the present disclosure, the processing circuit is further configured to determine, based on the measured downlink channel qualities, a second base station set from the serving base station and the neighboring base stations, the second base station set indicating a set of base stations to cache the data information in advance.

According to another preferred embodiment of the present disclosure, the processing circuit is further configured to determine a second predetermined number of base stations, variation trends of which are increment and amplitudes of which rank first, as the second base station set.

According to another preferred embodiment of the present disclosure, the processing circuit is further configured to generate a report comprising the data information and the first base station set to be sent to the serving base station.

According to another preferred embodiment of the present disclosure, the electronic device further operates as the user equipment and further comprises: a first interface configured to support cellular communication.

According to another preferred embodiment of the present disclosure, the electronic device sends a priority indication indicating a priority of the data information to the serving base station via the first interface.

According to another preferred embodiment of the present disclosure, the electronic device further comprises: a second interface configured to support device to device communication.

According to another preferred embodiment of the present disclosure, the electronic device receives, via the first interface, a group identifier sent by the serving base station based on the priority indication, and broadcasts the group identifier via the second interface.

According to another preferred embodiment of the present disclosure, the downlink channel qualities comprise one or more of Channel Quality Indication, Reference Signal Reception Power, Reference Signal Reception Quality, Reception Signal Strength Indication and Reference Signal-Signal to Interference plus Noise Ratio.

According to another aspect of the present disclosure, there is further provided an electronic device at base station end in wireless communication, the electronic device comprising a processing circuit configured to: determine data information and a first base station set according to a report from a user equipment served by the base station so as to send the data information to each base station in the first base station set, wherein the first base station set is determined by the user equipment according to measured downlink channel qualities for the base station and neighboring base stations, and indicates a set of base stations to broadcast or multicast the data information.

According to another aspect of the present disclosure, there is further provided an electronic device at base station end in wireless communication, the electronic device comprising a processing circuit configured to: determine a first zone set according to a zone to which a movement position of a user equipment served by the base station belongs and an effective range of data information from the user equipment, wherein the zone is obtained by dividing a cell coverage range; and determine a first base station set according to a cell to which each zone in the first zone set belongs so as to send the data information to each base station in the first base station set, wherein the first base station set indicates a set of base stations to broadcast or multicast the data information.

According to another aspect of the present disclosure, there is further provided an electronic device at user equipment end in wireless communication, the electronic device comprising a processing circuit configured to: generate a report comprising at least an effective range of data information of the user equipment to be sent to a serving base station of the user equipment, so that the serving base station determines a first zone set according to a zone to which a movement position of the user equipment belongs and the effective range and determines a first base station set based on the first zone set so as to send the data information to each base station in the first base station set, wherein the zone is obtained by dividing a cell coverage range, and the first base station set indicates a set of base stations to broadcast or multicast the data information.

According to another aspect of the present disclosure, there is further provided a method at user equipment end in wireless communication, the method comprising: measuring downlink channel qualities of a serving base station of the user equipment and neighboring base stations; and determining, based on the measured downlink channel qualities, a first base station set from the serving base station and the neighboring base stations, wherein the first base station set indicates a set of base stations to broadcast or multicast data information.

According to another aspect of the present disclosure, there is further provided a method at base station end in wireless communication, the method comprising: determining data information and a first base station set according to a report from a user equipment served by the base station so as to send the data information to each base station in the first base station set, wherein the first base station set is determined by the user equipment according to measured downlink channel qualities for the base station and neighboring base stations, and indicates a set of base stations to broadcast or multicast the data information.

According to another aspect of the present disclosure, there is further provided a method at base station end in wireless communication, the method comprising: determining a first zone set according to a zone to which a movement position of a user equipment served by the base station belongs and an effective range of data information from the user equipment, wherein the zone is obtained by dividing a cell coverage range; and determining a first base station set according to a cell to which each zone in the first zone set belongs so as to send the data information to each base station in the first base station set, wherein the first base station set indicates a set of base stations to broadcast or multicast the data information.

According to another aspect of the present disclosure, there is further provided a method at user equipment end in wireless communication, the method comprising: generating a report comprising at least an effective range of data information of the user equipment to be sent to a serving base station of the user equipment, so that the serving base station determines a first zone set according to a zone to which a movement position of the user equipment belongs and the effective range and determines a first base station set based on the first zone set so as to send the data information to each base station in the first base station set, wherein the zone is obtained by dividing a cell coverage range, and the first base station set indicates a set of base stations to broadcast or multicast the data information.

According to other aspects of the present disclosure, there is further provided a computer program code and a computer program product for implementing the foregoing methods according to the present disclosure, and a computer readable storage medium having stored thereon the computer program code for implementing the foregoing methods according to the disclosure.

According to embodiments of the present disclosure, a base station set to broadcast or multicast data information from a user equipment is quickly determined according to downlink channel quality measurement results for surrounding base stations and/or geographical position prediction, and as compared with the prior art, it is made possible to reduce signaling interaction and to improve a data transmission performance in a scenario (including but not limited to V2X communication) where a user equipment quickly moves.

Other aspects of embodiments of the present disclosure will be given in the following specification part, wherein preferred embodiments for sufficiently disclosing embodiments of the present disclosure are described in detail, without applying limitations thereto.

BRIEF DESCRIPTION OF THE DRAWINGS

The present disclosure can be better understood with reference to the detailed description given in conjunction with the appended drawings below, wherein throughout the drawings, same or similar reference signs are used to represent same or similar components. The appended drawings, together with the detailed descriptions below, are incorporated in the specification and form a part of the specification, to further describe preferred embodiments of the present disclosure and explain the principles and advantages of the present disclosure by way of examples. In the appended drawings.

EMBODIMENTS OF THE INVENTION

Hereinafter, exemplary embodiments of the present disclosure will be described in detail in conjunction with the appended drawings. For the sake of clarity and conciseness, the specification does not describe all features of actual embodiments. However, it should be understood that in developing any such actual embodiment, many decisions specific to the embodiments must be made, so as to achieve specific objects of a developer; for example, those limitation conditions related to the system and services are met, and these limitation conditions possibly would vary as embodiments are different. In addition, it should be appreciated that although developing tasks are possibly complicated and time-consuming, such developing tasks are only routine tasks for those skilled in the art benefiting from the contents of the present disclosure.

It should also be noted herein that, to avoid the present disclosure from being obscured due to unnecessary details, only those device structures and/or processing steps closely related to the solution according to the present disclosure are shown in the appended drawings, while omitting other details not closely related to the present disclosure.

Prior to specific description of embodiments of the present disclosure, it should be noted that although the technology of the present disclosure is described by taking vehicle communication (V2X) application scenario as an example in embodiments of the present disclosure, the technology of the present disclosure is obviously not limited to this application scenario, but may be similarly applied to any communication scenario where a position of a communication device dynamically changes; moreover, examples of a user equipment are obviously not limited to an in-vehicle terminal (e.g., an in-vehicle navigation device) either, but may include any mobile terminal (such as an intelligent cellphone, a tablet computer, a Personal Digital Assistant (PDA) and the like). V2X communication may for example include Vehicle-to-Vehicle (V2V) communication, Vehicle to Infrastructure (V2I) communication, Vehicle to Pedestrian (V2P) communication and the like.

Next, embodiments of the present disclosure will be described in detail with reference to FIG. 1 through FIG. 21.

Figure 1:
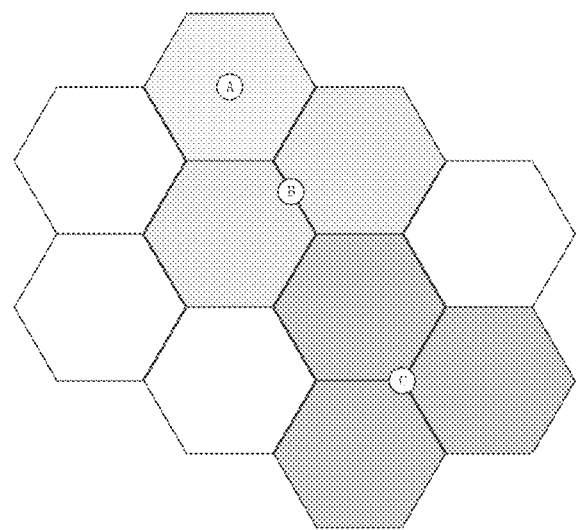
FIG. 1 is a schematic view showing changes of a downlink multicast/broadcast area in different scenarios.

FIG. 1 is a schematic view showing changes of a downlink multicast/broadcast area in different scenarios of V2X communication. As shown in FIG. 1, in scenario A, a T-VUE is located at a central area of its serving cell, and all R-VUEs under the influence of its V2X message are located within the cell, thus only requiring multicast/broadcast to be performed within this cell; in scenario B, the T-VUE is located at a boundary area of two neighboring cells, and all R-VUEs under the influence of its V2X message are located within the two cells, thus requiring multicast/broadcast to be performed within the two neighboring cells; and in scenario C, the T-VUE is located at a boundary area of three neighboring cells, and all R-VUEs under the influence of its V2X message are located within the three cells, thus requiring multicast/broadcast to be performed within the three neighboring cells.

It can be understood that, in the V2X communication, quick movement of the vehicle will cause quick changes in positions of the T-VUE and the R-VUEs and the members of the R-VUEs, thereby further causing dynamic changes in a multicast/broadcast range and dynamic changes in Receiving Vehicular UEs within an effective range of the V2X message; thus, a solution capable of efficiently determining a multicast/broadcast area is highly desired.

First Embodiment

Figure 2:
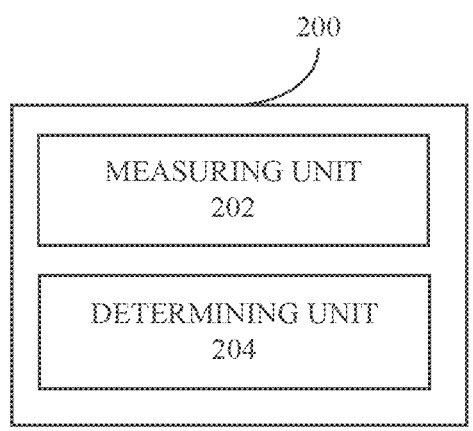
FIG. 2 is a block diagram showing a function configuration example of an electronic device at user equipment end in wireless communication according to a first embodiment of the present disclosure.

First, a function configuration example of an electronic device at user equipment end in wireless communication according to a first embodiment of the present disclosure will be described with reference to FIG. 2. FIG. 2 is a block diagram showing a function configuration example of an electronic device at user equipment end in wireless communication according to a first embodiment of the present disclosure.

As shown in FIG. 2, an electronic device 200 at user equipment end according to the embodiment may comprise a measuring unit 202 and a determining unit 204.

The measuring unit 202 may be configured to measure downlink channel qualities of a serving base station of the user equipment and neighboring base stations. The measurement event may either be executed in response to a predetermined trigger event or be executed periodically according to a predetermined period, and the present disclosure does not make limitations to this. The predetermined trigger event may include but is not limited to a V2X message sending request.

Downlink channel quality measurement results may comprise one or more of Channel Quality Indication (CQI), Reference Signal Reception Power (RSRP), Reference Signal Reception Quality (RSRQ), Reception Signal Strength Indication and Reference Signal-Signal to Interference plus Noise Ratio (RS-SINR). In the description below, the specific implementation of the technology of the present disclosure is described by taking RSRP as an example. However, it is obvious that the technology of the present disclosure may also be implemented alternatively using CQI, RSRQ, RSSI or RS-SINR or a combination thereof.

Specifically, for example, the measuring unit 202 may measure RSRP of its serving base station and neighboring base stations according to measurement configuration information from its serving base station (eNB). The measurement configuration information may be notified by the serving base station to the user equipment via for example a measConfig cell carried by a Radio Resource Control Connection Reconfiguration (RRCConnectionReconfiguration) message. The measurement configuration information may comprise one or more of measurement object, base station list, reporting manner, measurement identifier, event parameter and the like. In the application example, the measurement object is RSRP, the base station list is a serving base station and neighboring base stations, the reporting manner is periodically reporting, and the measurement manner is continuous measurement.

The determining unit 204 may be configured to determine, based on the measured downlink channel qualities, a first base station set from the serving base station and the neighboring base stations, the first base station set indicating a set of base stations to broadcast or multicast data information from the user equipment.

Specifically, the downlink channel quality measurement results (information such as variation trends, amplitudes and the like) may be used to reflect a movement trajectory of the user equipment (e.g., a Transmission Vehicular UE) and a position thereof relative to surrounding base stations. For example, if, within a predetermined measurement time (e.g., within a life cycle of data information), variation trends of measurement results of downlink channel qualities for a certain base station are increment and amplitudes of average measurement values or of final values at the end of measurement are larger, it is indicated that the Transmission Vehicular UE is approaching the base station and is at a near distance from the base station, so that user equipment within a cell coverage range of the base station will suffer from the influence of the data information, making it necessary to add the base station into the first base station set, so as to multicast/broadcast the data information of the transmission user equipment to the user equipment within its cell coverage range.

Specifically, the determining unit 204 may be configured to determine the first base station set based on variation trends and amplitudes of the measured downlink channel qualities.

Preferably, as an exemplary implementation manner, the determining unit 204 may determine the first base station set based on differential relationship among a first predetermined number of downlink channel qualities, the variation trends of which are increment and the amplitudes of which rank first, and an effective range of the data information.

Specifically, it is assumed that, the determining unit 204 selects downlink channel qualities (for example RSRP herein), of which variation trends are increment, and ranks these downlink channel qualities according to average values (or according to final values at the end of measurement) from largest to smallest, and takes top K (it is assumed herein that K is equal to for example 3) RSRP, which are respectively represented as RSRP1, RSRP2 and RSRP3 and respectively correspond to base stations eNB1, eNB2 and eNB3. Then, the determining unit 204 may determine the corresponding first base set for example according to the following differential relationships:

(a) if RSRP1−RSRP2>T1 and RSRP1−RSRP3>T1, it may be determined that the first base station set only comprises base station eNB1;

(b) if RSRP1−RSRP2<T2 and RSRP1−RSRP3>T1, it may be determined that the first base station set comprises base stations eNB1 and eNB2; and (c) if RSRP1−RSRP2<T2 and RSRP1−RSRP3<T2, it may be determined that the first base station set comprises base stations eNB1, eNB2 and eNB3.

Figure 3:
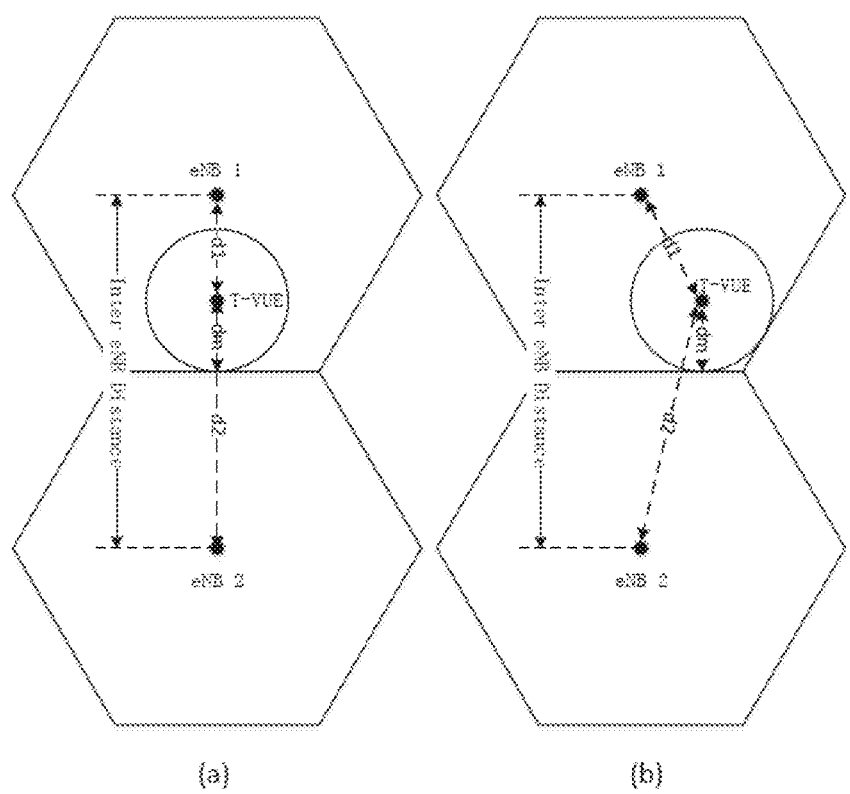
FIG. 3 is a schematic view showing a first exemplary manner for determining a first base station set according to an embodiment of the present disclosure.

T1 and T2 respectively represent predetermined thresholds, and satisfy T1>T2. An exemplary manner for determining T1 and T2 will be described in detail below. FIG. 3 is a schematic view showing a first exemplary manner for determining a first base station set according to an embodiment of the present disclosure.

In the example as shown in FIG. 3, it is assumed that, an effective range of data information (which is for example a VX message) is dm, power of eNB1 which is received at the T-VUE is RSRP1, power of eNB2 which is received at the T-VUE is RSRP2, and a power difference is RSRP1−RSPR2. A distance from the T-VUE to eNB1 is d1, a distance from the T-VUE to eNB2 is d2, and a distance between base stations eNB1 and eNB2 is D. In this case, the value of T1 may be taken as a maximum of the power difference which ensures all the Receiving Vehicular UEs R-VUEs to be right located within a coverage range of eNB1, as shown by (a) in FIG. 3; moreover, the value of T2 may be taken as a minimum of the power difference which ensures all the Receiving Vehicular UEs R-VUEs to be right located within the coverage range of eNB1, as shown by (b) in FIG. 3. Through calculation and simplification according to the above calculation condition, it can be found that the values of T1 and T2 are related to the effective range dm of the V2X message.

The effective range dm of the V2X message is used to reflect a coverage range within which the R-UEs are desired to receive the message. Generally, the effective range dm of the V2X message may be related to at least one of a category of the data information and a movement speed of the user equipment. Exemplarily, the category of the V2X message may be distinguished by an importance degree or influence degree of the message or a place where the message occurs. In a certain example, the category may be distinguished by a priority of the message. For example, for a V2X message (having a high priority) containing a serious traffic accident, the effective range dm of the V2X message may be larger. In another example, the category of the message is distinguished by a place where the vehicle is located at the time of sending the message. For example, for a V2X message sent at the time of traveling within an urban range, the effective range of the V2X message may be for example 150 meters; and for a V2X message sent at the time of traveling on an expressway, the effective range of the V2X message may be for example 320 meters. In addition, in another example, if a traveling speed of the vehicle is greater, the effective range dm shall be larger in order to ensure a response time of the Receiving Vehicular UEs.

For the control of the effective range dm, this control can be implemented in various manners. For example, if the effective range of the message is within a transmission capability range of the user equipment, the user equipment can form different effective ranges through power control. For example, the Transmission Vehicular UE may adjust its transmission power according to a current traveling speed, a category of a message to be sent and the like, so as to form an effective range of the message. If vehicles within the effective range receive the message, the vehicles can make corresponding responses (for example, adjust their traveling speeds, traveling routes and the like) according to the received message (for example, a road safety message and the like), and besides, the effective range dm may also be controlled by controlling the Receiving Vehicular UEs to selectively parse the V2X message. For example, the vehicles within the effective range receive and parse the V2X message. For vehicles beyond the effective range, since the message possibly has no great influence on these vehicles, these vehicles unnecessarily parse the message or make responses even if they receive the message.

It should be noted that, although the example of determining the first base station set based on the above three differential relationships has been given above, it is obvious that the differential relationships are not limited to the above three ones, but instead, many differential relationships (e.g., differential relationship between RSRP2 and RSRP3) may be considered. In a certain embodiment, to reduce the load of calculation, it is possible that only differential relationships between measurement values of the selected downlink channel qualities and a maximum thereamong are necessarily considered in order to determine the first base station set.

Figure 4:
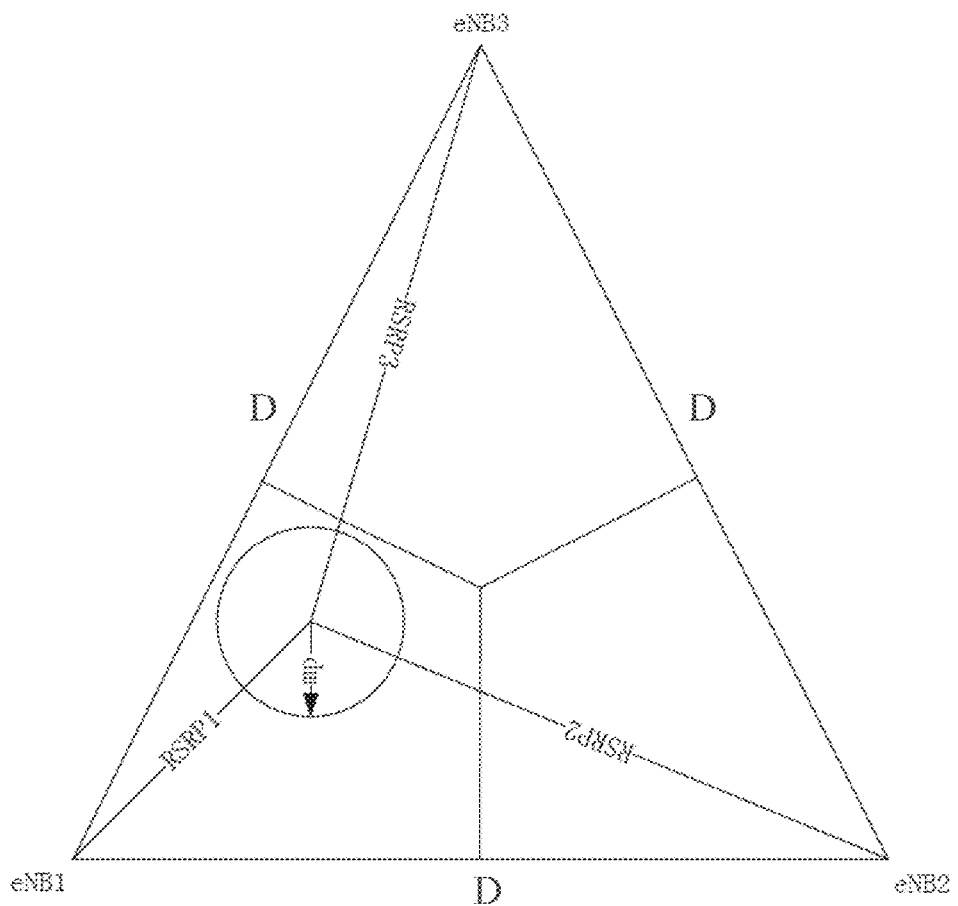
FIG. 4 is a schematic view showing a second exemplary manner for determining a first base station set according to an embodiment of the present disclosure.

On the other hand, in a case where none of the above three differential relationships is satisfied, the determining unit 204 may be further configured to determine the first base station set based further on distances among base stations corresponding to the first predetermined number of downlink channel qualities. Specifically, for example, the manner described with reference to FIG. 4 below may be utilized to determine the first base station set. FIG. 4 is a schematic view showing a second exemplary manner for determining a first base station set according to an embodiment of the present disclosure.

In the example as shown in FIG. 4, it is assumed that transmission power of the Transmission-Vehicular UE T-VUE is P and that power of eNB1, eNB2 and eNB3 received at the T-VUE are RSRP1, RSRP2 and RSRP3 respectively, then it can be determined that distances $d_1$, $d_2$ and $d_3$ from the T-VUE to eNB1, eNB2 and eNB3 are respectively:

$$d_1 = \sqrt[n]{\frac{P}{RSRP1}}$$

$$d_2 = \sqrt[n]{\frac{P}{RSRP2}}$$

$$d_3 = \sqrt[n]{\frac{P}{RSRP3}}.$$

Then as shown in FIG. 4, a relative position of the T-VHE is determined using a triangulation measurement method according to $d_1$, $d_2$, $d_3$ and respective inter-base station distances D, and furthermore, a circle taking the T-VUE as a center and dm as a radius is obtained according to the effective range dm of the V2X message, and the first base station set is determined according to a coverage range of the circle.

It should be noted that, although it has been described above that the manner as shown in FIG. 4 is not utilized to determine the position of the T-VUE to further determine the first base station set unless in a case where the differential relationships are judged as not being satisfied, this is only exemplary but not limiting. Actually, the determining manner as shown in FIG. 4 has more universal applicability, that is, it is also possible to determine the first base station set utilizing the manner as shown in FIG. 4 directly, without needing to judge the differential relationships. However, to reduce the load of calculation, preferably, it is possible to, as described above, first determine the first base station set utilizing the differential relationships, and then determine the first base station set using the triangulation measurement method as shown in FIG. 4 if the first base station set cannot be determined utilizing the differential relationships, thus making it possible to not only reduce the load of calculation as far as possible but also efficiently determine the first base station set.

Preferably, the electronic device 200 may further comprise a generating unit, which may be configured to generate a report comprising the data information and the first base station set to be sent to its serving base station. Accordingly, the serving base station may send the data information to each base station in the first base station set according to the received report, so as to multicast/broadcast the received data information by the base stations.

As can be seen, according to the foregoing solution for determining a multicast/broadcast area according to downlink channel quality measurement, even if in a case where position information of the user equipment is unavailable, for example in a case where the vehicle is located in a place such as a tunnel or an underground parking lot or the like so that GPS signals are occluded, it is still possible to quickly determine a multicast/broadcast base station set.

In addition, for the V2X communication, since both the Transmission Vehicular UE and the Receiving Vehicular UEs are in movement, the multicast/broadcast area is also dynamically changing. For example, as shown in FIG. 1, it is assumed that the Transmission Vehicular UE moves from scenario A to scenario B and then to scenario C, so that the multicast/broadcast area also correspondingly changes. Thus, in case of transmitting the V2X message between the base stations after the first base station set is determined, an unnecessary latency possibly will be caused.

To solve the problem, preferably, caching the V2X message in advance in some base stations on the traveling route of the Transmission Vehicular UE may be considered, so that these base stations can immediately multicast/broadcast the cached V2X message when they fall within the multicast/broadcast area. In this way, it is made possible to greatly reduce an unnecessary latency, thus improving the real-time of the V2X message.

Preferably, the determining unit 204 may be further configured to determine, based on the measured downlink channel qualities, a second base station set from the serving base station and the neighboring base stations, the second base station set indicating a set of base stations to cache the data information in advance.

As an exemplary implementation manner, the determining unit 204 may determine a second predetermined number of base stations, variation trends of which are increment and amplitudes of which rank first, as the second base station set, according to the measurement result by the measuring unit 202.

It can be understood that, as described above, the base stations, variation trends of which are increment and amplitudes of which rank first, indicate that the user equipment (i.e., the Transmission Vehicular UE) is moving and approaching these base stations, that is, these base stations are located on the travelling route of the Transmission Vehicular UE, thus making it possible to send, by the serving base station of the user equipment, via for example X2 interface, the data information in advance to these base stations to be cached. In this way, once the Transmission Vehicular UE travels to a corresponding position so that these caching base stations fall within the multicast/broadcast area, these base stations can immediately multicast/broadcast the cached data information.

Figure 5:
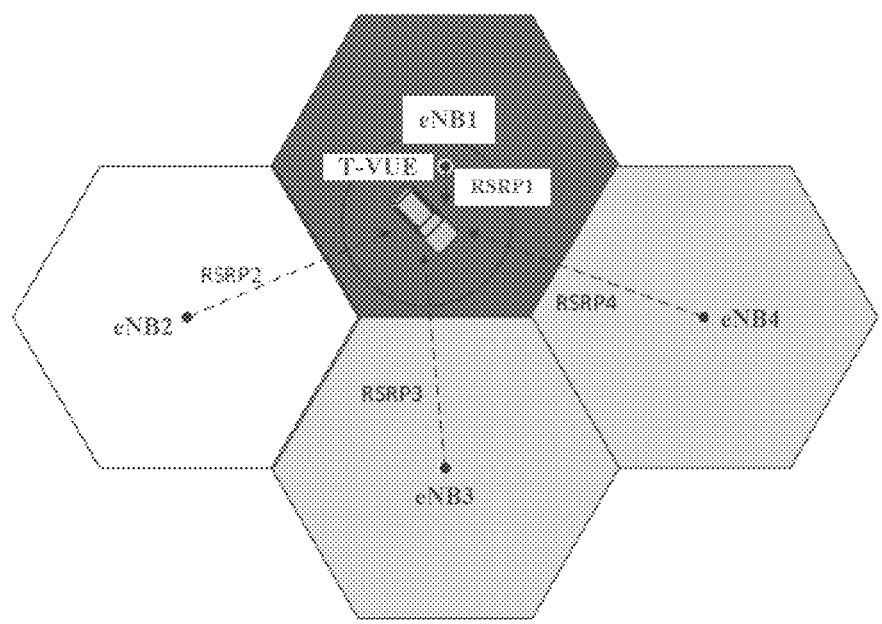
FIG. 5 is a schematic view showing an example of a second base station set according to an embodiment of the present disclosure.

Specifically, for example, the determining unit 204 may select continuously-incrementing RSRP at the end of measurement and rank these RSRP according to their average values (or final values at the end of measurement) from largest to smallest, and take top N RSRP, where for example N=4, so that eNB1, eNB2, eNB3 and eNB4 corresponding to RSRP1, RSRP2, RSRP3 and RSRP4 are determined as the second base station set. FIG. 5 is a schematic view showing an example of a second base station set according to an embodiment of the present disclosure.

It should be noted that generally, N≥K, that is, the first base station set (i.e., the multicast/broadcast base station set) is a subset of the second base station set (i.e., the cache base station set). In other words, the cache base station set generally includes base stations in a broader range, while the multicast/broadcast base station set only considers base stations to perform multicast/broadcast at a current position.

Preferably, the report generated by the above generating unit further comprises information about the second base station set. Generally speaking, the serving base station of the user equipment is included in the determined second base station set, so that the serving base station can send, according to the received report, via for example X2 interface, the data information in advance to each base station in the second base station set to be cached.

As a preferred manner, since the report generated by the generating unit comprises the first and second base station sets and the first base station set is generally a subset of the second base station set, a report format about the base station sets may be simplified as shown in TABLE 1.

TABLE 1

| Report Format of Base Station Sets |
| --- |
| CellID1+ (1/0)  CellID2+ (1/0)  CellID3+ (1/0) . . .  CellIDN+ (1/0) |

As can be seen, the generated report comprises cell identifiers (cellIDs) of the determined N cache base stations and one identifier bit, wherein "1" represents that the base station belongs to the first base station set (the multicast/broadcast base station set), and "0" represents that the base station belongs to the second base station set (the cache base station set).

In this way, when a certain base station becomes from a cache base station to a multicast/broadcast base station, the serving base station is only required to send a one-bit identifier "1" to the base station, thereby triggering the base station which receives the identifier to multicast/broadcast the data information. In this way, it is made possible to reduce signaling overhead among the base stations.

It should be noted that, although the exemplary manners for determining the first and second base stations have been given above, this is only exemplary but not limiting, and those skilled in the art may modify the above exemplary manners according to the following principle of the present disclosure: downlink channel quality measurement results reflect information such as a relative position between a user equipment and a base station, a travelling route of a user equipment and the like, thus making it possible to determine corresponding multicast/broadcast area and cache area according to the downlink channel quality measurement results. For example, the values of K and N are not particularly limited, but may be selected according to actual conditions. Also for example, the downlink channel quality measurement results are not necessarily RSRP, but may be CQI, RSRQ, RSSI or RS-SINR or the like. Also for example, it is possible to determine a multicast/broadcast area using a triangulation measurement method directly, not based on differential relationships.

In addition, the following scenario is considered: it is not the case that all user equipment within a coverage range of the multicast/broadcast base station necessarily receive data information from a transmission user equipment, and generally speaking, only user equipment within a certain range around the transmission user equipment necessarily receive the data information. Thus, it is desired to be capable of avoiding unnecessary reception by a user equipment so as to lower power consumption.

In the prior art, there are generally two broadcast manners, i.e., Multicast Broadcast Single Frequency Network (MBSFN) manner and Single-Cell Point To Multipoint (SC-PTM) manner. For the MBSFN manner, multiplexing with a Physical Downlink Shared Channel (PDSCH) or synchronous signaling is impossible, and in each frame only six sub-frames are assigned for the MBSFN, thus limiting the capacity of the MBSFN. The MBSFN has a problem that broadcast universally exists, that is, unnecessary reception exists. For example, after the Transmission Vehicular UE leaves a transmission range of V2V, vehicles within the MBSFN range shall further detect all data packets, thus increasing power consumption. For the SC-PTM manner, it performs multicast to specific user equipment, and prior to the multicast, an eNB will assign Temporary Mobile Group Identifiers (TMGIs) for the respective user equipment, thus avoiding unnecessary reception to some extent. However, for the V2X communication scenario, due to the quick movement and changes of the vehicles, all the vehicles shall frequently report geographical position information so that the eNB can determine to which vehicles identical TMGIs are assigned; moreover, in a case where the geographical position information is unavailable, it is impossible to assign appropriate TMGIs for the vehicles in real time. Thus, the existing SC-PTM manner results in large signaling overhead and has a certain application limitation.

In view of the foregoing problem, it is desired to provide a solution capable of ensuring data transmission performance and reducing signaling overhead while avoiding unnecessary reception by a user equipment.

In the V2X communication, V2X messages may be distinguished as being a high priority message and a low priority message. Since dedicated resources for the MBSFN are limited and the MBSFN does not necessarily assign group identifiers to users and has a shorter latency and a broader coverage range, the high priority message may preferentially use the MBSFN manner. Since the SC-PTM manner uses PDSCH resources and shall assign group identifiers to users, the low priority message may use the SC-PTM manner. The user equipment may, at the time of sending a Scheduling Request (SR) to the serving base station to request for assignment of uplink communication resources, report a priority of the data information sent at this time to the serving base station.

However, as described above, if the existing SC-PTM manner is directly applied to the V2X communication scenario, greater signaling overhead will be caused. Thus, the present disclosure proposes an improved SC-PTM manner for a communication scenario (e.g., V2X communication scenario) where a position of a communication device dynamically changes.

Taking the V2X communication scenario as an example, since vehicles under the influence of V2X are generally located within a certain distance around the Transmission Vehicular UE, sending a group identifier (e.g., RNTI) by the Transmission Vehicular UE is considered, and only surrounding vehicles capable of correctly receiving the group identifier necessarily receive the V2X message and decode the V2X message scrambled with the group identifier. The group identifier may be assigned by the serving base station in response to a priority indication indicating a priority of the V2X message sent by the user equipment.

In addition, since it is possible that new vehicles continuously join or exit around the Transmission Vehicular TV, the Transmission Vehicular UE may periodically broadcast the group identifier in order to ensure the newly joined vehicles to correctly decode the V2X message.

According to the above embodiment, it is made possible to ensure the reception performance of high priority data information and reduce signaling overhead while avoiding unnecessary reception.

As can be seen, in the V2X communication, the above electronic device 200 not only supports cellular communication so as to perform communication with base stations but also supports Device-to-Device (D2D) communication so as to directly communicate with other vehicle devices.

As a preferred implementation manner, the electronic device 200 may further comprise a first interface (e.g., Uu interface) supporting cellular communication and a second interface (e.g., PC5 interface) supporting D2D communication. For example, the electronic device 200 may send a priority indication indicating a priority of the data information to the serving base station via the first interface and receive the group identifier sent by the serving base station based on the priority indication, and then periodically broadcast the group identifier via the second interface.

It can be understood that, the foregoing electronic device 200 may be realized in chip level or may also be realized in device level by including other external components. For example, the electronic device 200 may as a whole operate as a user equipment, and thus may include the foregoing first and second interfaces to perform cellular communication and device-to-device communication. In addition, it should also be understood that the first and second interfaces are only logic divisions made according to the functions thereof. In actual implementation, the two interfaces may also be combined into one interface, which can support both cellular communication and device-to-device communication.

Figure 6:
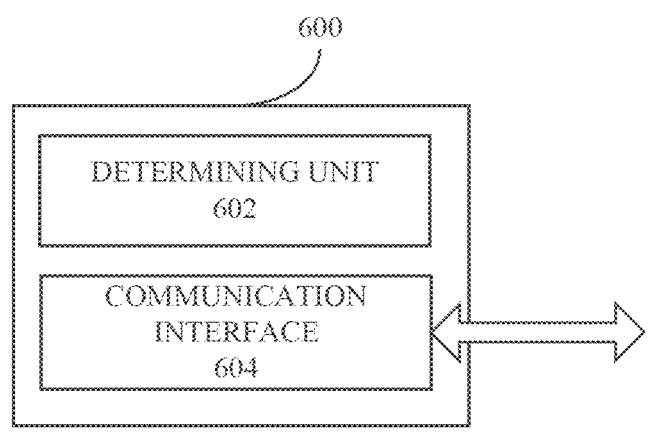
FIG. 6 is a block diagram showing a function configuration example of an electronic device at base station end in wireless communication according to a first embodiment of the present disclosure.

In correspondence to the electronic device at user equipment end as described above, an electronic device at base station end will be described with reference to FIG. 6 below. FIG. 6 is a block diagram showing a function configuration example of an electronic device at base station end in wireless communication according to a first embodiment of the present disclosure.

As shown in FIG. 6, an electronic device 600 according to the embodiment may comprise a determining unit 602 and a communication interface 604.

The determining unit 602 may be configured to determine data information and a first base station set according to a report from a user equipment served by the base station. The first base station set may, as described above, be determined by the user equipment according to measured downlink channel quality measurement results for the base station and surrounding base stations, and indicates a set of base stations to broadcast or multicast the data information of the user equipment.

The communication interface 604 may be configured to perform transceiving operations. Specifically, the electronic device 600 may receive the report comprising the data information and the first base station set from the user equipment via the communication interface 604, and send the data information to each base station in the first base station set according to a determination result by the determination unit 602 via the communication interface 604. It should be noted, that the communication interface 604 is alternative (shown by a dashed frame in FIG. 6); for example, in a case where the electronic device 600 is realized in chip level, it may not be incorporated with transceiving functions and thus does not necessarily include the communication interface 604.

Preferably, as described above, the report from the user equipment may further comprise a second base station set, and accordingly, the determining unit 602 may be further configured to determine a second base station set according to the received report so as to send, via the communication interface 604, the data information to each base station in the second base station set to be cached. The second base station may, as described above, be determined by the user equipment according to measured downlink channel quality measurement results for the base station and surrounding base stations.

For the specific process for determining the first and second base station sets, reference may be made to the foregoing description, and repeated descriptions will not be made herein.

Preferably, the determining unit 602 may be further configured to determine, according to the received report, an identifier indicating whether a specific base station belongs to the first base station set or the second base station set so as to send the identifier together with the data information to the base station. As described above, when the user equipment reports the determined base station set to the serving base station, besides an identifier (ID) of each base station, the report further comprises an identifier indicating whether the base station belongs to the first base station set or the second base station set, for example, an identifier "1" representing that the base station belongs to the first base station set, and an identifier "0" representing that the base station belongs to the second base station set, so that the electronic device 600 at base station end can, according to the determined identifier, send the data information and the identifier "1" to a base station belonging to the first base station set, so as to instruct the base station to perform multicast/broadcast after receiving the data information, and send the data information and the identifier "0" to a base station belonging to the second base station set, so as to instruct the base station to only cache the received data information but not perform multicast/broadcast.

In addition, preferably, with the movement of the user equipment, when the determining unit 603 determines, according to the received report, that a base station which originally belongs to the second base station becomes a base station belonging to the first base station, it may generate an identifier indicating that the base station belongs to the first base station set to be sent to the base station. Specifically, for example, at this time, the electronic device 600 may send the generated identifier "1" to a corresponding base station, for triggering the base station to multicast/broadcast the cached data information.

It should be noted herein that, although the exemplary implementation solutions for determining the first and second base station sets by the user equipment end have been described above, these determination operations alternatively may also be performed by the base station end, that is, the user equipment reports the obtained downlink channel quality measurement results to its serving base station, so as to determine the first and second base stations by the base station according to the above manner. In this case, the user equipment only needs to send the data information to the serving base station, and the serving base station will, according to the base station set determined by itself, send the data information and the corresponding identifier to the corresponding base stations, respectively.

In addition, preferably, to avoid unnecessary reception, the determining unit 602 may also determine, according to a priority indication indicating a priority of the data information received from the user equipment, a group identifier for the user equipment to be sent to the user equipment via the communication interface 604. Specifically, if it is determined that the data information belongs to low priority information, a corresponding group identifier may be assigned for the user equipment, and accordingly the user equipment may broadcast the group identifier, so that only user equipment capable of receiving the group identifier can receive and decode the data information scrambled with the group identifier.

As an exemplary implementation manner, it is possible to, by the electronic device 600, scramble the received data information with the group identifier and send the scrambled data information to each base station in the first and second base station sets. Alternatively, as another exemplary implementation manner, the electronic device 600 may also send the group identifier together with the data information to each base station in the first and second base station sets but not perform scrambling, and when it is necessary to perform multicast/broadcast, the data information is scrambled and multicast/broadcast by a corresponding base station with the group identifier.

It can be understood that, similarly, the foregoing electronic device 600 may be realized in chip level or may also be realized in device level by including other external components. For example, the electronic device 600 may not include the above communication interface 604 when it is realized in chip level; and the electronic device 600 may as a whole operate as a base station when it is realized in device level.

In addition, it should be understood that, each unit in the above electronic devices 200 and 600 is only a logic function module divided according to the specific functions implemented by the unit, but is not used to limit a specific implementation manner. In actual implementation, said each function unit may be realized as an independent physical entity, or may also be realized by a single entity (e.g., a processor (a CPU or a DSP or the like), an integrated circuit, etc.).

To further facilitate the understanding of the technical solution in the above embodiment, exemplary flowcharts for implementing solutions for determining a downlink multicast/broadcast area based on downlink channel quality measurement will be briefly described with reference to FIG. 7A and FIG. 7B below.

Figure 7A:
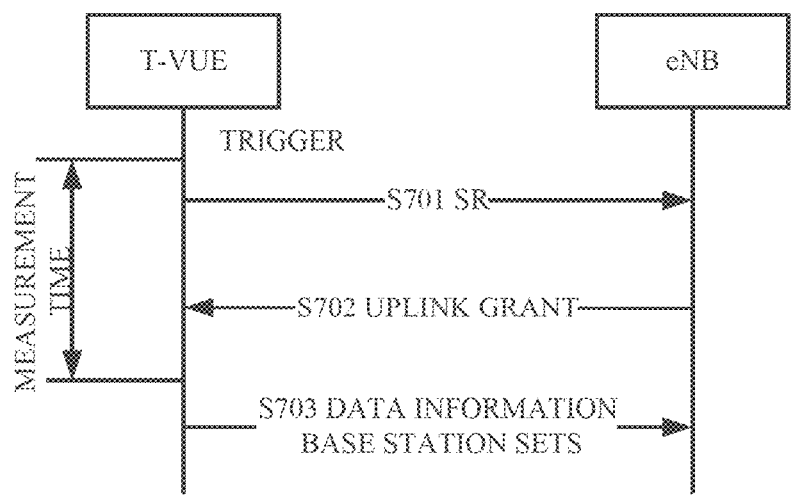
FIG. 7A is an interaction flowchart showing an example of a solution for determining a downlink multicast/broadcast area based on downlink channel quality measurement according to an embodiment of the present disclosure.

FIG. 7A is an interaction flowchart showing an example of a solution for determining a downlink multicast/broadcast area based on downlink channel quality measurement according to an embodiment of the present disclosure.

Firstly, as shown in FIG. 7A, a user equipment (which is for example a Transmission Vehicular UE T-VUE herein) starts to measure downlink channel qualities of surrounding base stations, in response to a predetermined trigger event or according to a predetermined period. Then, in step S701, the Transmission Vehicular UE T-VUE sends a Scheduling Request (SR) to a serving base station (eNB) on corresponding sources, to request for assignment of uplink transmission resources. Subsequently, in step S702, the serving base station eNB assigns uplink resources for the T-VUE by Uplink grant (UL grant) signaling. Then, at the end of measurement, in step S703, the Transmission Vehicular UE T-VUE reports data information and base station sets (including first and second base station sets) determined according to measured downlink channel qualities to the serving base station on the assigned uplink resources. A report format about the base station sets for example may be as shown in the above TABLE 1.

Alternatively, as described above, the determination of the first and second base station sets may also be performed by the base station end. An interaction flowchart in this case will be described with reference to FIG. 7B below.

Figure 7B:
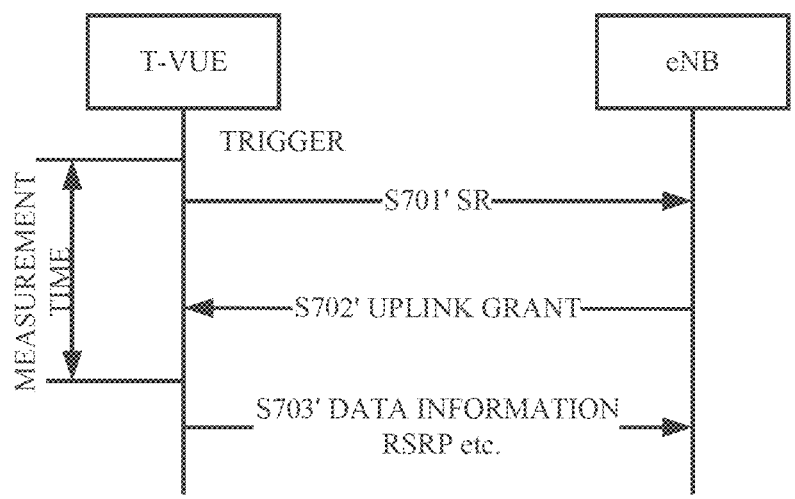
FIG. 7B is an interaction flowchart showing another example of a solution for determining a downlink multicast/broadcast area based on downlink channel quality measurement according to an embodiment of the present disclosure.

FIG. 7B is an interaction flowchart showing another example of a solution for determining a downlink multicast/broadcast area based on downlink channel quality measurement according to an embodiment of the present disclosure.

The interaction flowchart as shown in FIG. 7B is substantially the same as the interaction flowchart as shown in FIG. 7A, except for a difference in the following: in step S703', instead of reporting the determined base station sets to the serving base station, the user equipment reports the data information and the downlink channel quality measurement results (e.g., RSRP) to the serving base station, to determine the first base station set and/or the second base station set by the serving base station using a corresponding algorithm according to the measurement results.

It should be noted that, the interaction flowcharts as shown in FIG. 7A and FIG. 7B are only exemplary but not limiting, and those skilled in the art may also modify the above interaction flowcharts according to the foregoing detailed description and the principle of the present disclosure. For example, it is possible to send a priority indication indicating a priority of the data information to the serving base station while sending an SR. Also for example, when sending the data information and the downlink channel quality measurement results to the serving base station, it is also necessary to send information such as an effective range of the data information and the like to the serving base station, for the base station to determine the first base station and the second base station and the like. All such modifications obviously shall fall within the scope of the present disclosure, and will not be listed herein one by one.

Second Embodiment

The solutions for determining a downlink multicast/broadcast area based on downlink channel quality measurement have been described above. A solution for determining a downlink multicast/broadcast area based on geographical position prediction will be described with reference to FIG. 8 through FIG. 11 below.

Figure 8:
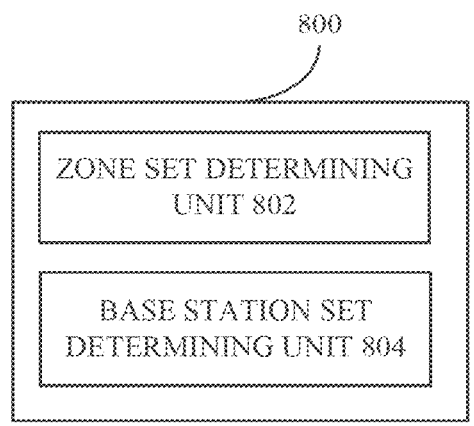
FIG. 8 is a block diagram showing a block diagram showing a function configuration example of an electronic device at base station end in wireless communication according to a second embodiment of the present disclosure.

FIG. 8 is a block diagram showing a block diagram showing a function configuration example of an electronic device at base station end in wireless communication according to a second embodiment of the present disclosure.

As shown in FIG. 8, an electronic device 800 according to the embodiment may comprise a zone set determining unit 802 and a base station set determining unit 804.

The zone set determining unit 802 may be configured to determine a first zone set according to a movement position of a user equipment and an effective range of data information from the user equipment.

The zones herein are obtained by dividing a cell coverage range, and generally may be configured in advance at network end, and the serving base station has known the division of zones within a local cell and neighboring cells in advance.

As an example, the division of zones may include but is not limited to the following manners: unified division in the global network based on geographical position coordinates (e.g., longitude and latitude), so that each zone has a unique Zone Identifier (ZoneID_Global) in the global network; independent division according to actual circumstances within a single cell, wherein for example, for a small cell, granularity of zone division may be smaller so that zones obtained through the division are more dense, and for a macro cell, granularity of zone division may be larger so that zones obtained through the division are more sparse, and in this case, each zone may be uniquely identified with a cell identifier and a zone identifier within the cell (CellID+ZoneID_Local); and division performed within a cell set composed of two or more neighboring cells, wherein in this case, each zone may be uniquely identified with a cell set identifier and a zone identifier within the set (CellSetID+ZoneID_Local).

Figure 9:
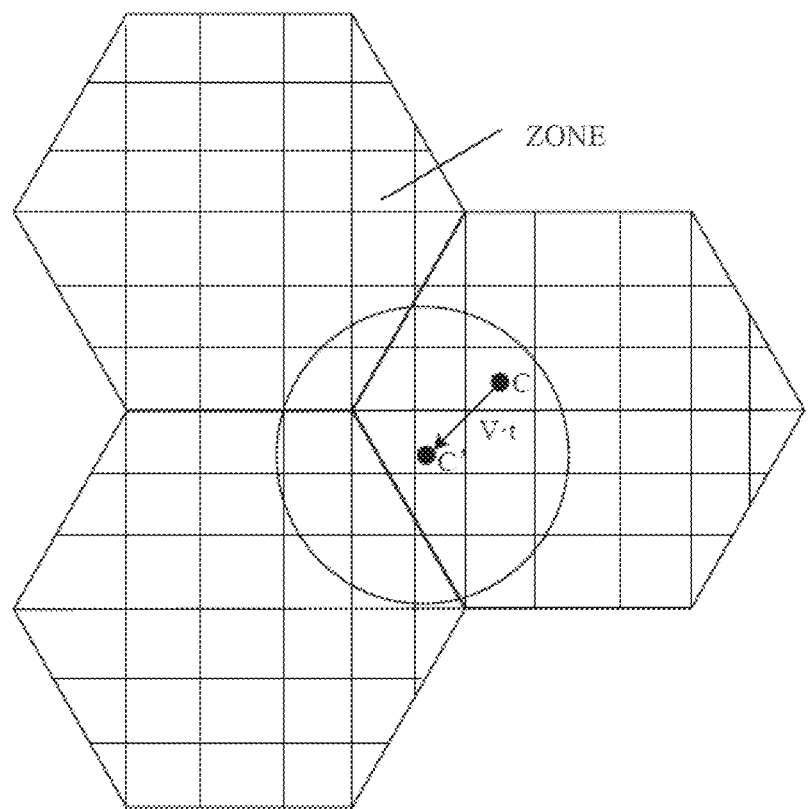
FIG. 9 is a schematic view showing an example of zone division according to an embodiment of the present disclosure.

As can be seen, there is no inevitable relationship between a zone and a cell except for that in terms of division granularity, granularity of a zone is generally coarser than granularity of specific geographical position information and finer than granularity of a cell. In addition, the division of zones is of course not limited to the manners listed above, either; those skilled in the art may perform appropriate zone division according to actual requirements, and the specific division granularity may also be determined according to actual scenarios, and the present disclosure does not make detailed limitation to this. FIG. 9 is a schematic view showing an example of zone division according to an embodiment of the present disclosure. As shown in FIG. 9, each grid may represent a zone.

As an exemplary implementation manner, in a case where the geographical position information is available, the zone set determining unit 802 may be configured to estimate the movement position of the user equipment according to current position information and movement speed reported by the user equipment, thereby determining, based on for example a correspondence (e.g., a form of a lookup table) between the position information stored in advance and the zone, the zone to which the movement position belongs.

Specifically, as shown in FIG. 9, after receiving the report information, the electronic device 800 estimates a movement position C' of the user equipment after elapse of a time interval ∇t according to current position C and movement speed V of the user equipment, and determines the zone to which the movement position belongs, wherein the time interval ∇t represents a time interval from a time when the serving base station receives the report information to a corresponding broadcast resource. The determination process may be represented as follows:

$$C'=C+V \times \nabla t$$

$$C' \rightarrow ZoneID.$$

Alternatively, as another exemplary implementation manner, if the position information is unavailable, the movement position of the user equipment may also be determined based on measurement results of downlink channel qualities for surrounding base stations by the user equipment. That is, the zone set determining unit 802 may be further configured to estimate the movement position of the user equipment according to downlink channel quality measurement results for the base station and neighboring base stations reported by the user equipment, thereby determining, based on a correspondence stored in advance, the sub-zone to which the movement position belongs.

Specifically, according to the manner as described above with reference to FIG. 4, the zone set determining unit 802 may estimate, using a triangulation measurement method, the movement position of the user equipment according to the downlink channel quality measurement results and inter-base station distances, the downlink channel quality measurement results comprising at least variation trends and amplitudes of downlink channel qualities. The specific implementation process is substantially the same as the process of determining the relative position of the user equipment as described above with reference to FIG. 4, except for a difference in the following: in the foregoing description, the position where the user equipment is located is estimated by the user equipment, whereas in the embodiment, the user equipment shall report measurement results to the serving base station to estimate, by the base station, the movement position of the user equipment. This process will not be repeatedly described herein.

It can be understood that, in the foregoing solution for estimating the movement position of the user equipment based on downlink channel quality measurement results, since downlink channel quality measurement results, of which variation trends are increment, are selected, the movement position estimated herein is also a predicted position on a movement trajectory of the user equipment, which is similar to the foregoing solution based on geographical position information.

After the zone where the user equipment is located is determined as described above, the zone set determining unit 802 may determine a first zone set under the influence of the data information, according to the determined zone where the user equipment is located in combination with the effective range dm of the data information reported by the user equipment, i.e., ZoneID+dm→Zone Set.

Then, the base station set determining unit 804 may be configured to determine a first base station set according to the determined cell to which each sub-zone in the first sub-zone set belongs, so that the serving base station can send the data information from the user equipment to each base station in the first base station set to be multicast/broadcast, i.e., Zone Set→eNB Set.

It can be understood that, in the foregoing technical solution, a change in the first base station set is determined based on a change in the zone, instead of based on a change in the specific geographical position information; since the division granularity of the zone is between the division granularity of the cell and the division granularity of the specific geographical position, in this solution although the user equipment still will periodically report the geographical position information or the channel quality measurement information, if the estimated zone where the user equipment is located does not change, the zone set under the influence of the data information does not change, and accordingly the base station set to be multicast/broadcast does not change either. In this way, for e.g. the V2X communication scenario where a position of a vehicle frequently changes, it is made possible to greatly reduce processing load and reduce signaling overhead.

Similarly, as described above, the determination of the second base station set as the cache base station set may also be performed by the serving base station end. Preferably, the base station set determining unit 804 may be further configured to determine a second base station set according to downlink channel quality measurement results for the serving base station and neighboring base stations reported by the user equipment, so that the serving base station can send the data information in advance to each base station in the second base station set to be cached.

Specifically, the base station set determining unit 804 may determine a predetermined number of base stations, variation trends of the downlink channel quality measurement results of which are increment and amplitudes of the downlink channel quality measurement results of which rank first, as the second base station set. The specific manner for determining the second base station set is the same as the foregoing determination manner implemented by the user equipment end, and will not be repeatedly described herein.

It can be understood that, the foregoing electronic device 800 may be realized in chip level or may also be realized in device level by including other external components. For example, the electronic device 800 may also include a communication interface to as a whole operate as a base station, and the communication interface may be configured to perform transceiving operations, for example, to perform transceiving operations with the user equipment and other base stations.

It should be noted herein that the electronic device 800 herein may, like the above electronic device 600, also perform operations for avoiding unnecessary reception. For details, reference may be made to the foregoing corresponding description, and repeated description will not be made herein.

Figure 10:
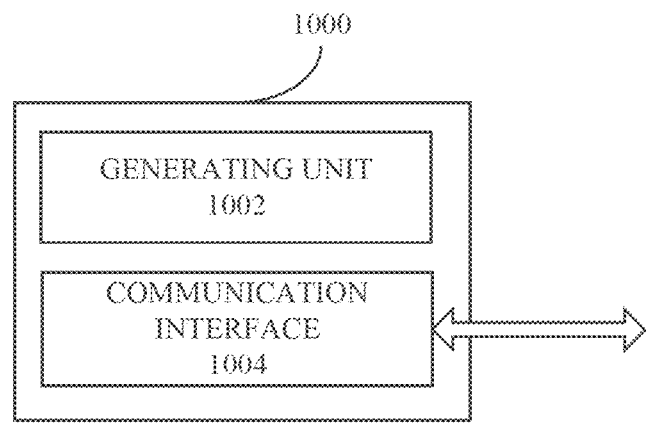
FIG. 10 is a block diagram showing a block diagram showing a function configuration example of an electronic device at user equipment end in wireless communication according to a second embodiment of the present disclosure.

In correspondence to the electronic device 800 at base station end, a function configuration example of an electronic device at user equipment end will be described with reference to FIG. 10 next. FIG. 10 is a block diagram showing a block diagram showing a function configuration example of an electronic device at user equipment end in wireless communication according to a second embodiment of the present disclosure As shown in FIG. 10, an electronic device 1000 according to the embodiment may comprise a generating unit 102 and a communication interface 1004.

The generating unit 1002 may be configured to generate a report comprising at least an effective range of data information of the user equipment.

Then, the electronic device 1000 sends the generated report to a serving base station via the communication interface 1004, so that the serving base station can determine a first zone set according to a zone to which a movement position of the user equipment belongs and the effective range of the data information and determine a first base station set based on the first zone set so as to send the data information to each base station in the first base station set to be multicast/broadcast.

The communication interface 1004 may be configured to support cellular communication and device-to-device communication. It can be understood that, the communication interface 1004 is alternative (shown by a dashed frame in FIG. 10); for example, in a case where the electronic device 1000 is realized in chip level, it may not be incorporated with transceiving functions and thus does not necessarily include the communication interface 1004.

Preferably, the generated report may further comprise current position information and movement speed of the user equipment for the serving base station to estimate the movement position of the user equipment.

In addition, preferably, the generated report may further comprise downlink channel quality measurement results for the serving base station and surrounding base stations by the user equipment for the serving base station to estimate the movement position of the user equipment and determine a second base station set to cache the data information in advance.

It should be noted that, the determination of the movement position may also be performed at the user equipment end. Specifically, the user equipment may estimate the movement position of the user equipment according to downlink channel quality measurement results, and then send the movement position to the serving base station, so that the serving base station can determine a corresponding zone set according to the position and the known information such as zone division and the like to further determine the first base station set. Similarly, the determination of the second base station set may also be performed at the user equipment end.

It should be understood that the above electronic device 1000 may be realized in chip level or device level. The electronic device 600 may not include the above communication interface 1004 when it is realized in chip level; and the electronic device 1000 may as a whole operate as a user equipment when it is realized in device level In addition, it should be noted that, each unit in the above electronic devices 800 and 1000 is only a logic function module divided according to the specific function implemented by the unit, but is not used to limit a specific implementation manner. In actual implementation, said each function unit may be realized as an independent physical entity, or may also be realized by a single entity (e.g., a processor (a CPU or a DSP or the like), an integrated circuit, etc.).

Figure 11:
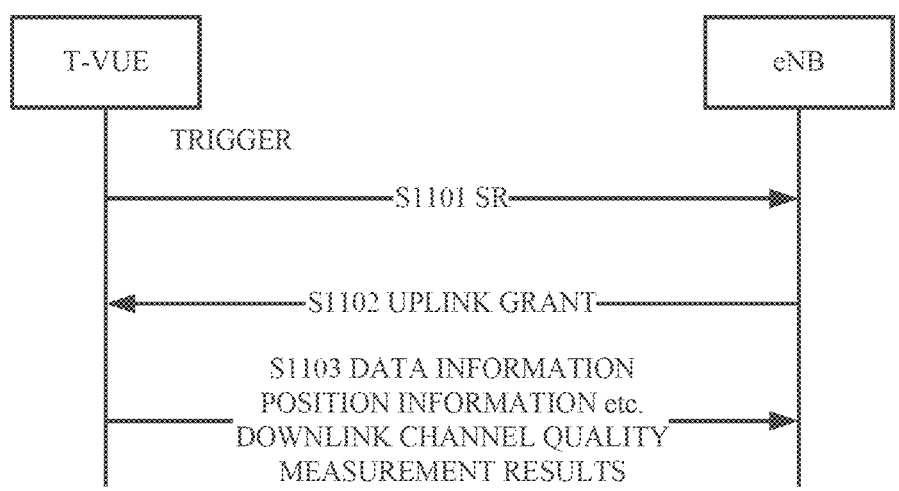
FIG. 11 is an interaction flowchart showing a solution for determining a downlink multicast/broadcast area based on geographical position prediction according to an embodiment of the present disclosure.

To further facilitate the understanding of the solution of the present embodiment, an exemplary interaction flow of a solution based on geographical position prediction will be described with reference to FIG. 11 below. FIG. 11 is an interaction flowchart showing a solution for determining a downlink multicast/broadcast area based on geographical position prediction according to an embodiment of the present disclosure.

As shown in FIG. 11, first, in step S1101, a user equipment (which is for example a Transmission Vehicular UE T-VUE herein) sends a Scheduling Request SR on corresponding resources, in response to a predetermined trigger event or according to a predetermined period. Then, in step S1102, a serving base station eNB assigns uplink resources for the user equipment by UL grant. Next, in step S1103, the user equipment reports information to the serving base station on the assigned uplink resources. The report information may comprise data information itself and an effective range dm of the data information, and besides, may further alternatively comprise current geographical position and movement speed of the user equipment, and downlink channel quality measurement results for surrounding base stations by the user equipment, etc. In this way, the serving base station may determine a first base station set and an alternative second base station set according to the report information from the user equipment, and send the data information from the user equipment to these base stations via for example X2 interface.

It should be noted herein that, the foregoing operations described as being performed at the base station end or the user equipment end are not limited to be performed only at the end as described, but may alternatively be performed at the other end as long as the information needed for performing the operations is sent to the other end. Thus, the present disclosure does not particularly limit the subjects for performing the respective operations, and those skilled in the art may select to perform corresponding operations at appropriate ends according to the specific conditions (including factors such as processing capacity, communication load, power consumption and the like) at the time of implementing the technical solution of the disclosure, so as to realize system performance optimization.

In addition, it should also be noted that, although the function configurations of the electronic devices in the respective embodiments have been described above respectively, this is only exemplary but not limiting, and those skilled in the art may carry out additions, deletions, combinations, sub-combinations and alternations and the like for the functions in the above respective embodiments according to requirements. All of such modifications shall be construed to fall within the scope of the present disclosure.

Figure 12:
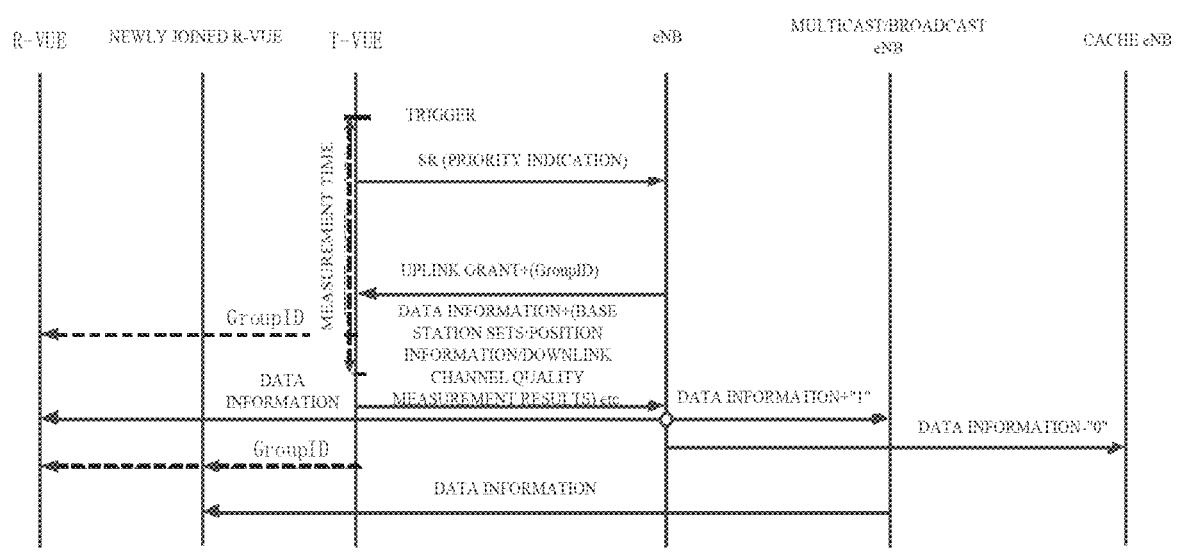
FIG. 12 is an interaction flowchart showing an example of carrying out an overall solution according to an embodiment of the present disclosure.

To further facilitate the overall understanding of the technical solution of the present disclosure, an overall working flow of the present disclosure will be described with reference to FIG. 12 below. FIG. 12 is an interaction flowchart showing an example of carrying out an overall solution according to an embodiment of the present disclosure. In FIG. 12, description is made by taking V2X communication scenario as an example.

As shown in FIG. 12, first, a Transmission Vehicular UE T-VUE sends a Scheduling Request SR to a serving base station eNB in response to a predetermined trigger event or according to a predetermined period, and may also simultaneously send a priority indication about a priority of data information (V2X message) to the serving base station eNB.

Then, the serving base station eNB assigns uplink resources for the Transmission Vehicular UE T-VUE by UL grant. Meanwhile, according to the received priority indication, if it is indicated that the V2X message has a low priority, it is demonstrated that a SC-PTM broadcast manner may be used, and accordingly, the serving base station eNB also sends the allocated group identifier (GroupID) to the Transmission Vehicular T-VUE.

Then, the Transmission Vehicular UE T-VUE broadcasts the group identifier. Since only Receiving Vehicular UEs R-VUEs within a certain range around the transmission Vehicular UE T-VUE can receive the group identifier and further receive and decode the data information scrambled with the GroupID, it is made possible to avoid unnecessary reception.

Next, the transmission Vehicular UE T-VUE reports the data information together with determined base station sets (including a first base station set and an alternative second base station set) or together with an effective range dm of the data information and geographical position information or uplink channel quality measurement results to the serving base station eNB.

Next, the serving base station eNB sends the data information and the identifier to the respective base stations according to the received report information; for example, for a multicast/broadcast base station, it sends identifier "1", and for a cache base station, it sends identifier "0", so that the base stations receiving the respective identifiers can multicast/broadcast or cache the received data information. In addition, it should be noted that as described above, in the case of low priority data information, the data information sent to the multicast/broadcast base station and the cache base station may be data information scrambled with the group identifier, or the serving base station may also send the original data information together with the group identifier to the respective base stations, so that the respective base stations scramble and multicast/broadcast the data information with the received group identifier when performing the multicast/broadcast. In addition, to ensure a newly joined Receiving Vehicular UEs to be capable of correcting receiving and demodulating the data information, the Transmission Vehicular UE may periodically broadcast its group identifier.

It should be noted that, the overall interaction flow as described with reference to FIG. 12 is only exemplary, and those skilled in the art may modify the interaction flow according to the principle of the present disclosure. In addition, the order of the respective operations as described above is not particularly limited, but may be properly adjusted according to actual requirements; for example, the respective operations may be performed in parallel or independently.

In correspondence to the foregoing device embodiments, the present disclosure further describes the following method embodiments.

Figure 13:
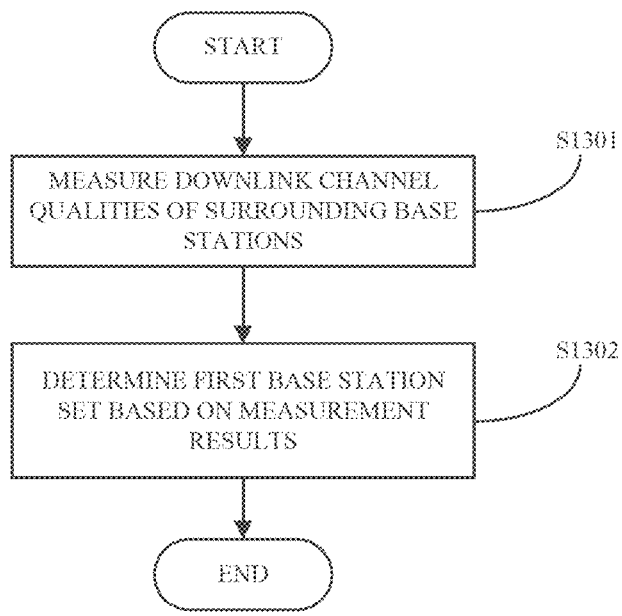
FIG. 13 is a flowchart showing a process example of a method at user equipment end in wireless communication according to an embodiment of the present disclosure.

FIG. 13 is a flowchart showing a process example of a method at user equipment end in wireless communication according to an embodiment of the present disclosure.

As shown in FIG. 13, a method 1300 according to the embodiment starts from step S1301. In the step S1301, downlink channel qualities of a serving base station of a user equipment and neighboring base stations are measured. The downlink channel qualities may include one or more of CQI, RSRP and RSRQ.

Then, the method proceeds to step S1302. In the step S1302, a first base station set is determined from the serving base station and the neighboring base stations based on the measured downlink channel qualities, the first base station set indicating a set of base stations to broadcast or multicast data information. Specifically, the first base station set may be determined based on variation trends and amplitudes of the downlink channel qualities in combination with an effective range of the data information. For the specific determination process, reference may be made to the foregoing corresponding description, and repeated description will not be made herein.

Preferably, the method may further comprise a step of determining a second base station set based on the measured downlink channel qualities, a step of generating a report comprising the data information, the determined first base station set and the alternative second base station set, a step of broadcasting a group identifier, a step of sending the generated report, and the like.

It should be understood that, the method embodiment as described herein corresponds to the embodiment of the electronic device 200 as described above with reference to FIG. 2. Thus for contents not described in detail herein, reference may be made to the foregoing corresponding description, and no repeated description will be made herein.

Figure 14:
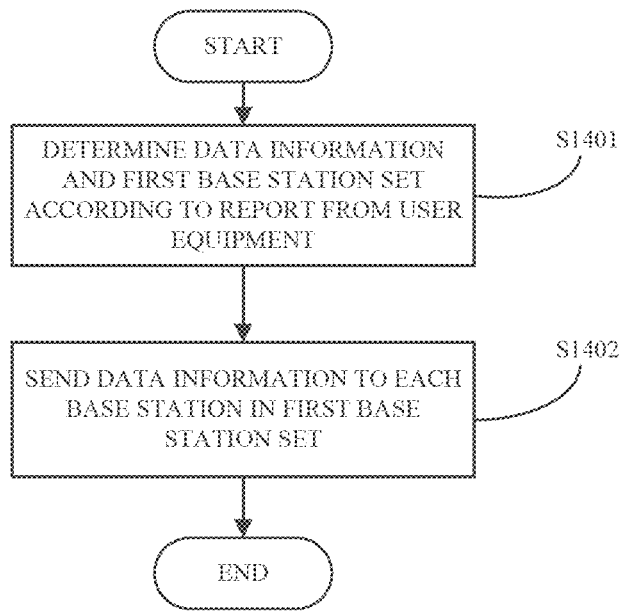
FIG. 14 is a flowchart showing a process example of a method at user equipment end in wireless communication according to another embodiment of the present disclosure.

FIG. 14 is a flowchart showing a process example of a method at base station end in wireless communication according to an embodiment of the present disclosure.

As shown in FIG. 14, a method according to the embodiment starts from step S1401. In the step S1401, corresponding data information and first base station set are determined according to a report from a user equipment served by the base station.

Then, the method proceeds to step S1402. In the step S1402, the data information is sent to each base station in the first base station set.

Preferably, the method further comprises a step of determining a second base station set according to the report information and sending the data information to each base station in the second base station set, a step of assigning a group identifier for the user equipment, and a step of scrambling the data information with the group identifier, and the like. In addition, preferably, while sending the data information, an identifier indicating whether the base station is a multicast/broadcast base station or a cache base station is also sent to a corresponding base station, to indicate whether the base station is to multicast/broadcast the received data information.

It should be understood that, the method embodiment as described herein corresponds to the embodiment of the electronic device 600 at base station end as described above with reference to FIG. 6. Thus for contents not described in detail herein, reference may be made to the foregoing corresponding description, and no repeated description will be made herein.

Figure 15:
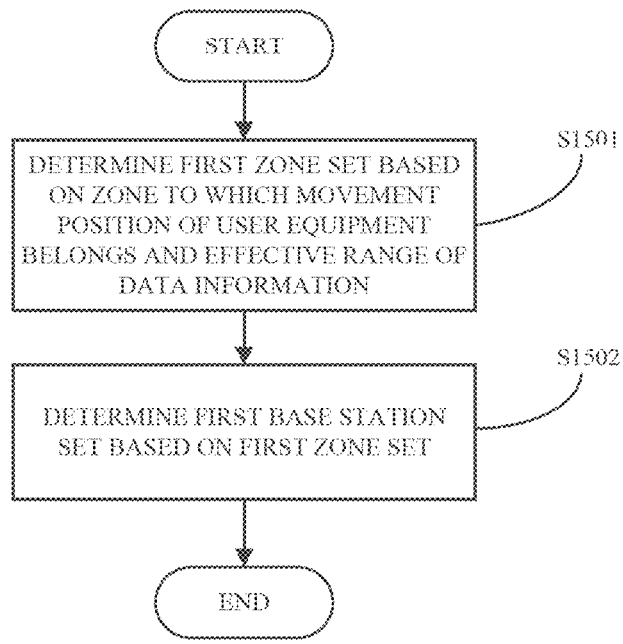
FIG. 15 is a flowchart showing a process example of a method at base station end in wireless communication according to an embodiment of the present disclosure.

FIG. 15 is a flowchart showing a process example of a method at base station end according to another embodiment of the present disclosure.

As shown in FIG. 15, the method starts from step S1501. In step S1501, a first zone set is determined according to a zone to which a movement position of a user equipment served by the base station belongs and an effective range of data information from the user equipment, the zone being obtained by dividing a cell coverage range. Preferably, the movement position of the user equipment may be estimated according to information such as current geographical position information and movement speed and the like, or the movement position of the user equipment may also be estimated, using a triangulation measurement method, based on the downlink channel quality measurement results reported by the user equipment and inter-base station distances.

Then, the method proceeds to step S1502. In the step S1502, a first base station set is determined according to a cell to which each sub-zone in the first zone set belongs so as to send the data information to each base station in the first base station set in a subsequent step.

Preferably, the method may further comprise a step of determining a second base station set based on the downlink channel quality measurement results and sending the data information to each base station in the second base station set.

It should be understood that, the method embodiment as described herein corresponds to the embodiment of the electronic device 800 at base station end as described above with reference to FIG. 8. Thus for contents not described in detail herein, reference may be made to the foregoing corresponding description, and no repeated description will be made herein.

Figure 16:
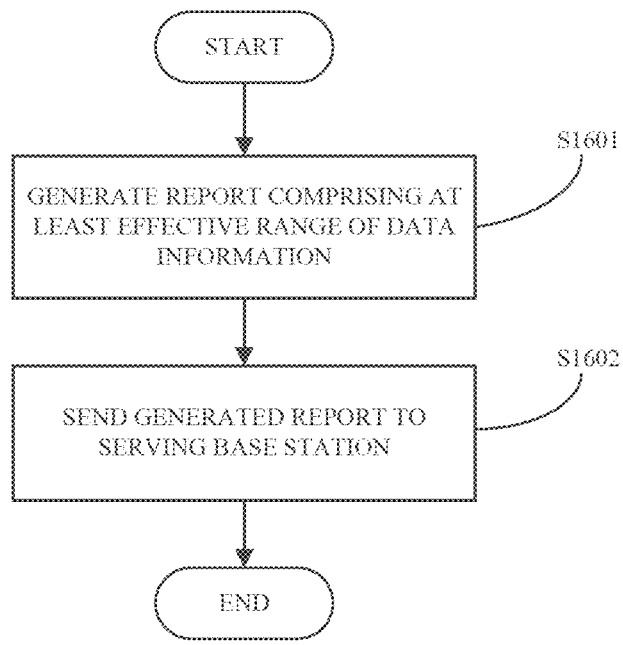
FIG. 16 is a flowchart showing a process example of a method at base station end in wireless communication according to another embodiment of the present disclosure.

FIG. 16 is a flowchart showing a process example of a method at user equipment end in wireless communication according to another embodiment of the present disclosure.

As shown in FIG. 16, a method 1600 according to the embodiment starts from step S1601. In the step S1601, a report comprising at least an effective range of data information of the user equipment is generated.

Then, the method proceeds to step S1602. In the step S1602, the generated report information is sent to a serving base station of the user equipment.

Preferably, the report may further comprise current position information and movement speed of the user equipment, downlink channel quality measurement results for surrounding base stations by the user equipment and the like for the serving base station to estimate the movement position of the user equipment. Then, a first zone set is determined in combination with the effective range of the data information, to further determine a first base station set.

It should be understood that, the method embodiment as described herein corresponds to the embodiment of the electronic device 1000 at user equipment end as described above with reference to FIG. 10. Thus for contents not described in detail herein, reference may be made to the foregoing corresponding description, and no repeated description will be made herein.

According to the foregoing embodiments of the present disclosure, the technical solutions of the present disclosure at least can realize one or more of the following advantages:

(1) by determining a multicast/broadcast base station set based on downlink channel quality measurement results, the problem in a case where geographical position information is unavailable is solved, and the defect in regard to large signaling overhead caused by maintaining position information of all vehicles by a base station in order to determine a multicast/broadcast base station set in the prior art is overcome;

(2) by determining a cache base station set to send data information in advance to these base stations to be cached, it is made possible to immediately perform multicast/broadcast once these base stations become multicast/broadcast base stations, thus reducing a latency;

(3) by determining a change in multicast/broadcast base stations based on a change in a zone, instead of based on a change in a specific geographical position, it is made possible to avoid too frequent determination of the multicast/broadcast base stations, thus reducing processing load, which is in particular advantageous to a case where a geographical position of a user equipment frequently changes; and (4) by selecting different multicast manners according to a priority of data information and assigning a group identifier for a user equipment sending low priority data information, it is made possible to not only ensure the reception performance of high priority data information but also avoid unnecessary reception, thus reducing device power consumption.

It should be understood that, the machine executable instructions in the storage medium and the program product according to the embodiments of the present disclosure may be further configured to implement the methods corresponding to the foregoing device embodiments. Thus for contents not described in detail herein, reference may be made to the foregoing corresponding description, and no repeated description will be made herein.

Accordingly, a storage medium for carrying the above program product comprising machine executable instructions is also included in the disclosure of the present invention. The storage medium includes but is not limited to a floppy disc, an optical disc, a magnetic optical disc, a memory card, a memory stick and the like.

Figure 17:
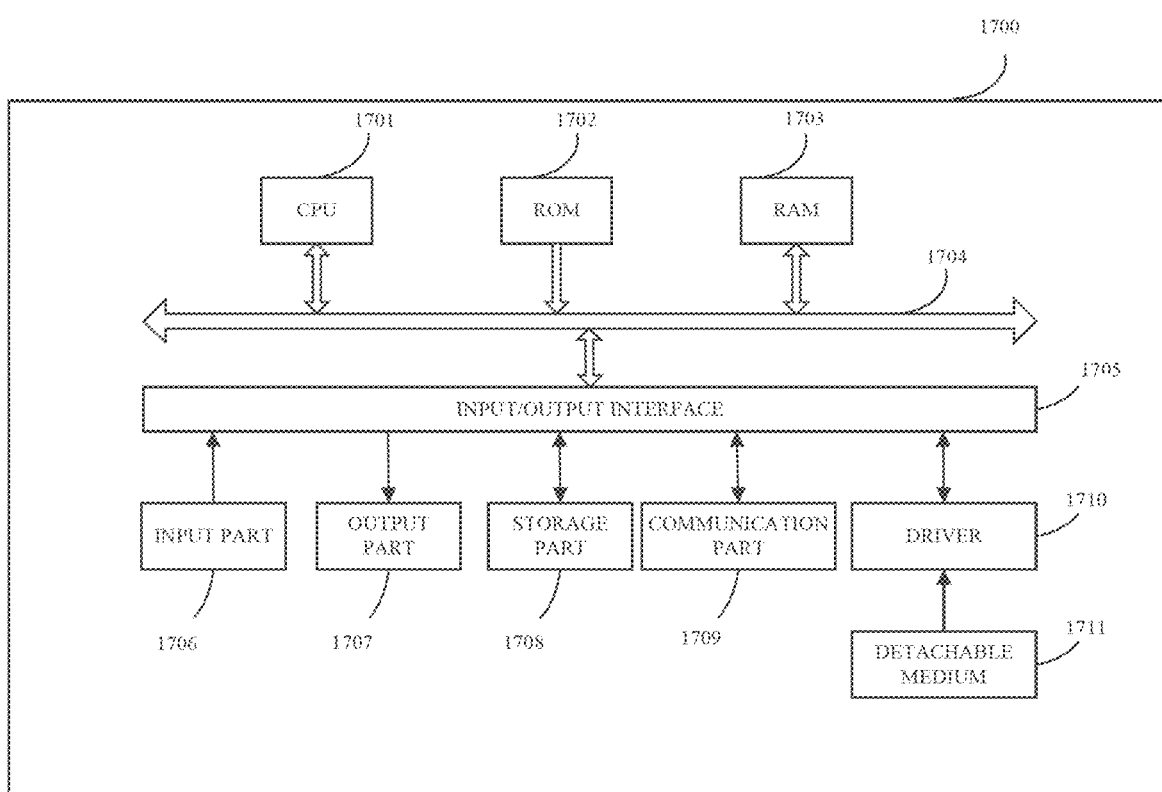
FIG. 17 is a block diagram showing an exemplary structure of a personal computer used as an information processing apparatus usable in an embodiment of the present disclosure.

In addition, it should also be noted that, the foregoing series of processing and devices may also be implemented by software and/or firmware. In the case of implementation by software and/or firmware, programs constituting the software are installed from a storage medium or a network to a computer having a dedicated hardware structure, for example the universal personal computer 1700 as shown in FIG. 17. The computer, when installed with various programs, can execute various functions and the like. FIG. 17 is a block diagram showing an exemplary structure of a personal computer as an information processing device usable in an embodiment of the disclosure.

In FIG. 17, a Central Processing Unit (CPU) 1701 executes various processing according to programs stored in a Read-Only Memory (ROM) 1702 or programs loaded from a storage part 1708 to a Random Access Memory (RAM) 1703. In the RAM 1703, data needed when the CPU 1701 executes various processing and the like is also stored according to requirements.

The CPU 1701, the ROM 1702 and the RAM 1703 are connected to each other via a bus 1704. An input/output interface 1705 is also connected to the bus 1704.

The following components are connected to the input/output interface 1705: an input part 1706, including a keyboard, a mouse and the like; an output part 1707, including a display, such as a Cathode Ray Tube (CRT), a Liquid Crystal Display (LCD) and the like, as well as a speaker and the like; the storage part 1708, including a hard disc and the like; and a communication part 1709, including a network interface card such as an LAN card, a modem and the like. The communication part 1709 executes communication processing via a network such as the Internet.

According to requirements, a driver 1710 is also connected to the input/output interface 1705. A detachable medium 1711 such as a magnetic disc, an optical disc, a magnetic optical disc, a semiconductor memory and the like is installed on the driver 1710 according to requirements, such that computer programs read therefrom are installed in the storage part 1708 according to requirements.

In a case where the foregoing series of processing is implemented by software, programs constituting the software are installed from a network such as the Internet or a storage medium such as the detachable medium 1711.

Those skilled in the art should appreciate that, such a storage medium is not limited to the detachable medium 1711 in which programs are stored and which are distributed separately from an apparatus to provide the programs to users as shown in FIG. 17. Examples of the detachable medium 1711 include a magnetic disc (including a floppy disc (registered trademark)), a compact disc (including a Compact Disc Read-Only Memory (CD-ROM) and a Digital Versatile Disc (DVD), a magneto optical disc (including a Mini Disc (MD) (registered trademark)), and a semiconductor memory. Or, the memory medium may be hard discs included in the ROM 1702 and the memory part 1708, in which programs are stored and which are distributed together with the apparatus containing them to users.

Application Examples

The technology of the present disclosure can be applied to various products, including a base station and a user equipment. Specifically, the base station may be realized as any type of evolutional node B (eNB), such as macro eNB and small eNB. The small eNB may be an eNB of a cell with smaller coverage than a macro cell, such as a pico eNB, a micro eNB and a home (femto) eNB. Alternatively, the base station may be realized as any other type of base station, such as NodeB and Base Transceiver Station (BTS). The base station may comprise: a main body (also called base station equipment) configured to control wireless communication; and one or more Remote Radio Heads (RRHs) arranged at a different place from the main body. In addition, all the various types of terminals which will be described below can operate as base stations by temporarily or semi-persistently executing base station functions.

The user equipment may be realized as a mobile terminal (such as an intelligent telephone, a tablet Personal Computer (PC), a notebook PC, a portable game terminal, a portable/softdog mobile router and a digital image pick-up device) or an in-vehicle terminal (such as an automobile navigation device). The user equipment may also be realized as a terminal for executing Machine-to-Machine (M2M) communication (also called a Machine Type Communication (MTC) terminal). In addition, the user equipment may be a wireless communication module (such as an integrated circuit module including a single wafer) installed on each of the above terminals.

Hereinafter, application examples according to the present disclosure will be described with reference to FIG. 18 through FIG. 21 below.

[Application Examples Regarding Base Station]

First Application Example

Figure 18:
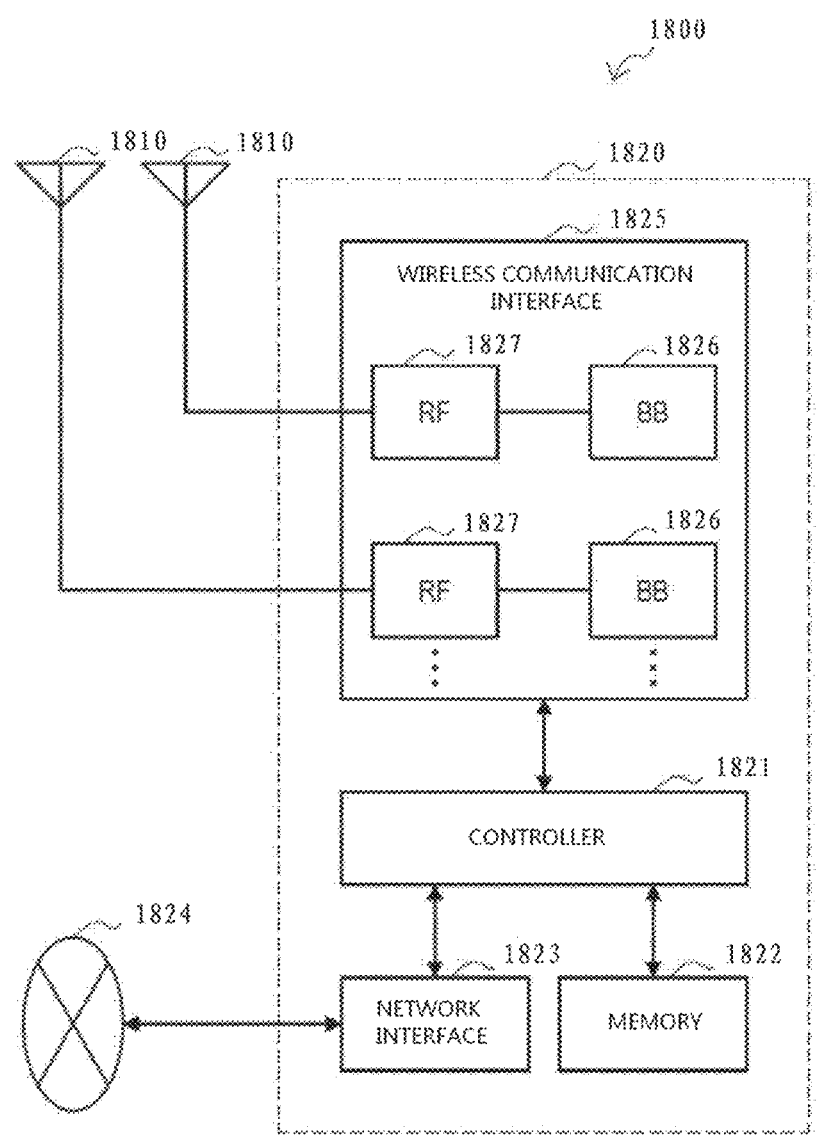
FIG. 18 is a block diagram showing a first example of a schematic configuration of an evolutional node (eNB) to which the technology according to the disclosure can be applied.

FIG. 18 is a block diagram showing a first example of schematic configuration of an eNB to which the technology according to the present disclosure can be applied. The eNB 1800 comprises one or more antennas 1810 and base station equipment 1820. The base station equipment 1820 and each antenna 1810 may be connected to each other via an RF cable.

Each of the antennas 1810 comprises a single or more antenna elements (such as a plurality of antenna elements included in a Multi-Input Multi-Output (MIMO) antenna), and is used for the base station equipment 1820 to transmit and receive a wireless signal. As shown in FIG. 18, the eNB 1800 may comprise a plurality of antennas 1810. For example, the plurality of antennas 1810 may be compatible with a plurality of frequency bands used by the eNB 1800. Although FIG. 18 shows an example in which the eNB 1800 comprises a plurality of antennas 1810, the eNB 1800 may also comprise a single antenna 1810.

The base station equipment 1820 may comprise a controller 1821, a memory 1822, a network interface 1823, and a wireless communication interface 1825.

The controller 1821 may be for example a CPU or a DSP, and manipulate various functions of a higher layer of the base station equipment 1820. For example, the controller 1821 generates data packets according to data in a signal processed by the wireless communication interface 1825, and transfers the generated packets via the network interface 1823. The controller 1821 may perform binding for data from a plurality of baseband processors to generate bound packets, and transfer the generated bound packets. The controller 1821 may have a logic function of executing control, which is such as radio resource control, radio bearer control, mobility management, admission rule and scheduling. The control may be executed in combination with a nearby eNB or a core network node. The memory 1822 comprises an RAM and an ROM, and stores programs executed by the controller 1821 and various types of control data (such as a terminal list, transmission power data, and scheduling data).

The network interface 1823 is a communication interface for connecting the base station equipment 1820 to a core network 1824. The controller 1821 may communicate with a core network node or another eNB via the network interface 1823. In this case, the eNB 1800 and the core network node or another eNB may be connected to each other via a logic interface (such as S1 interface and X2 interface). The network interface 1823 may also be a wired communication interface, or a wireless communication interface for a wireless backhaul. If the network interface 1823 is a wired communication interface, as compared with frequency bands used by the wireless communication interface 1825, the network interface 1823 may use higher frequency bands for wireless communication.

The wireless communication interface 1825 supports any cellular communication scheme (such as Long Term Evolution (LTE) and LTE-Advanced), and is provided with a wireless connection to a terminal located in a cell of the eNB 1800 via the antenna 1810. The wireless communication interface 1825 generally may comprise for example a BaseBand (BB) processor 1826 and an RF circuit 1827. The BB processor 1826 may execute for example coding/decoding, modulation/demodulation and multiplexing/demultiplexing, and execute various types of signal processing of layers (for example L1, Medium Access control (MAC), Radio Link Control (RLC) and Packet Data Convergence Protocol (PDCP)). Instead of the controller 1821, the BB processor 1826 may have part of all of the above logic function. The BB processor 1826 may be a memory which stores a communication control program, or a module comprising a processor configured to execute a program and a related circuit. The function of the BB processor 1826 may be changed through program updating. The module may be a card or blade inserted in a slot of the base station equipment 1820. Alternatively, the module may also be a chip installed on a card or blade. Meanwhile, the RF circuit 1827 may comprise for example a frequency mixer, a filter and an amplifier, and transmit and receive a wireless signal via the antenna 1810.

As shown in FIG. 18, the wireless communication interface 1825 may comprise a plurality of BB processors 1826. For example, the plurality of BB processors 1826 may be compatible with a plurality of frequency bands used by the eNB 1800. As shown in FIG. 18, the wireless communication interface 1825 may comprise a plurality of RF circuits 1827. For example, the plurality of RF circuits 1827 may be compatible with a plurality of antenna elements. Although FIG. 18 shows an example in which the wireless communication interface 1825 comprises a plurality of BB processors 1826 and a plurality of RF circuits 1827, the wireless communication interface 1825 may also comprise a single BB processor 1826 or a single RF circuit 1827.

Second Application Example

Figure 19:
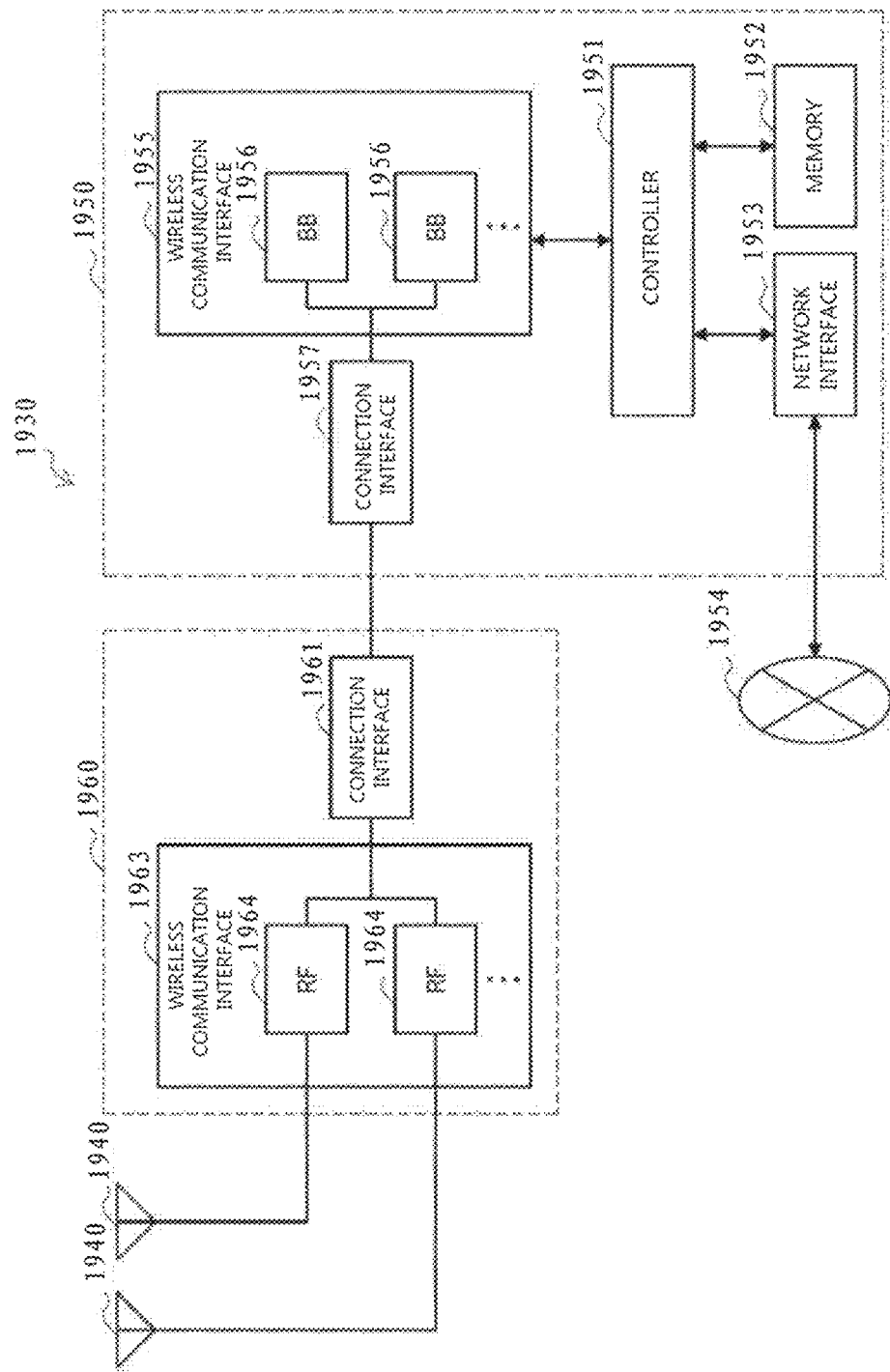
FIG. 19 is a block diagram showing a second example of a schematic configuration of an eNB to which the technology according to the present disclosure can be applied.

FIG. 19 is a block diagram showing a second example of schematic configuration of an eNB to which the technology according to the present disclosure can be applied. The eNB 1930 comprises a plurality of antennas 1940, base station equipment 1950, and an RRH 1960. The RRH 1960 and each antenna 1940 may be connected to each other via an RF cable. The base station equipment 1950 and the RRH 1960 may be connected to each other via a high-speed line such as an optical fiber cable.

Each of the antennas 1940 comprises a single or more antenna elements (such as a plurality of antenna elements included in an MIMO antenna) and is used for the RRH 1960 to transmit and receive a wireless signal. As shown in FIG. 19, the eNB 1930 may comprise a plurality of antennas 1940. For example, the plurality of antennas 1940 may be compatible with a plurality of frequency bands used by the eNB 1930. Although FIG. 19 shows an example in which the eNB 1930 comprises a plurality of antennas 1940, the eNB 1930 may also comprise a single antenna 1940.

The base station equipment 1950 comprises a controller 1951, a memory 1952, a network interface 1953, a wireless communication interface 1955, and a connection interface 1957. The controller 1951, the memory 1952 and the network interface 1953 are the same as the controller 1821, the memory 1822 and the network interface 1823 described with reference to FIG. 18.

The wireless communication interface 1955 supports any cellular communication scheme (such as LTE and LTE-Advanced), and is provided with a wireless connection to a terminal located in a sector corresponding to the RRH 1960 via the RRH 1960 and the antenna 1940. The wireless communication interface 1955 generally may comprise for example a BB processor 1956. The BB processor 1956 is the same as the BB processor 1826 described with reference to FIG. 18, except for that the BB processor 1956 is connected to the RF circuit 1964 of the RRH 1960 via the connection interface 1957. As shown in FIG. 19, the wireless communication interface 1955 may comprise a plurality of BB processors 1956. For example, the plurality of BB processors 1956 may be compatible with a plurality of frequency bands used by the eNB 1930. Although FIG. 19 shows an example in which the wireless communication interface 1955 comprises a plurality of BB processors 1956, the wireless communication interface 1955 may also comprise a single BB processor 1956.

The connection interface 1957 is an interface for connecting the base station equipment 1950 (the wireless communication interface 1955) to the RRH 1960. The connection interface 1957 may also be a communication module for communication in the above high-speed line for connecting the base station equipment 1950 (the wireless communication interface 1955) to the RRH 1960.

The RRH 1960 comprises a connection interface 1961 and a wireless communication interface 1963.

The connection interface 1961 is an interface for connecting the RRH 1960 (the wireless communication interface 1963) to the base station equipment 1950. The connection interface 1961 may also be a communication module for communication in the above high-speed line.

The wireless communication interface 1963 transmits and receives a wireless signal via the antenna 1940. The wireless communication interface 1963 generally may comprise for example an RF circuit 1964. The RF circuit 1964 may comprise for example a frequency mixer, a filter and an amplifier, and transmit and receive a wireless signal via the antenna 1940. As shown in FIG. 19, the wireless communication interface 1963 may comprise a plurality of RF circuits 1964. For example, the plurality of RF circuits 1964 may support a plurality of antenna elements. Although FIG. 19 shows an example in which the wireless communication interface 1963 comprises a plurality of RF circuits 1964, the wireless communication interface 1963 may also comprise a single RF circuit 1964.

In the eNB 1800 and the eNB 1930 as shown in FIG. 18 and FIG. 19, the communication interfaces in the foregoing electronic devices 600 and 800 may be realized by the wireless communication interface 1825 and the wireless communication interface 1955 and/or the wireless communication interface 1963. At least part of the functions of the determining unit, the zone set determining unit and the base station set determining unit may also be implemented by the controller 1821 and the controller 1951.

[Application Examples Regarding User Equipment]

First Application Example

Figure 20:
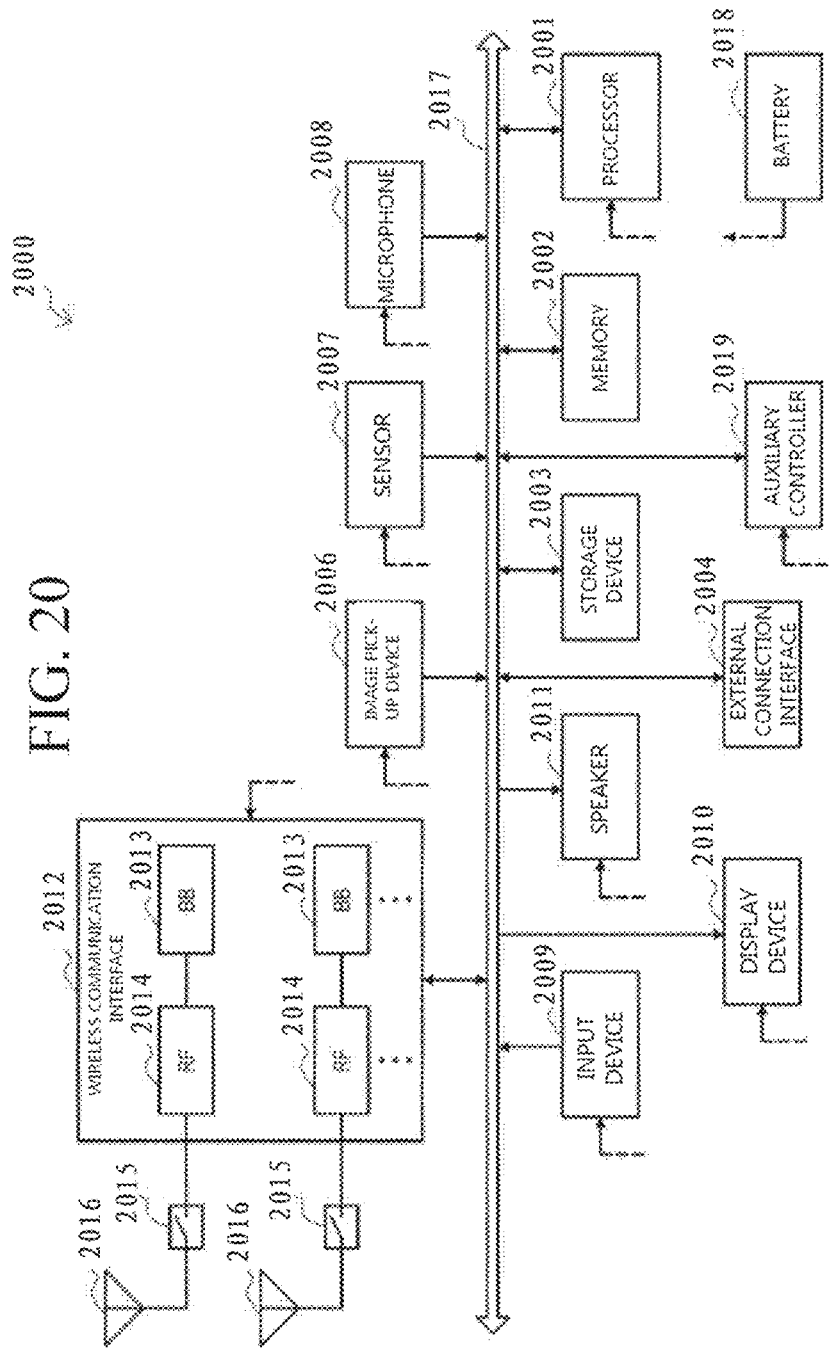
FIG. 20 is a block diagram showing an example of a schematic configuration of an intelligent telephone to which the technology according to the present disclosure can be applied.

FIG. 20 is a block diagram showing an example of schematic configuration of an intelligent telephone 2000 to which the technology according to the disclosure can be applied. The intelligent telephone 2000 comprises a processor 2001, a memory 2002, a storage device 2003, an external connection interface 2004, an image-pick up device 2006, a sensor 2007, a microphone 2008, an input device 2009, a display device 2010, a speaker 2011, a wireless communication interface 2012, one or more antenna switches 2015, one or more antennas 2016, a bus 2017, a battery 2018, and an auxiliary controller 2019.

The processor 2001 may be for example a CPU or a System on Chip (SoC), and control functions of an application layer and additional layers of the intelligent telephone 2000. The memory 2002 comprises an RAM and an ROM, and stores data and programs executed by the processor 2001. The storage device 2003 may comprise a storage medium, such as a semiconductor memory and a hard disc. The external connection interface 2004 is used for connecting an external device (such as a memory card and a Universal Serial Bus (USB) device) to an interface of the intelligent telephone 2000.

The image pick-up device 2006 comprises an image sensor (such as a Charge Coupled Device (CCD) and a Complementary Metal Oxide Semiconductor (CMOS)), and generates a captured image. The sensor 2007 may comprise a group of sensors, such as a measurement sensor, a gyro sensor, a geomagnetic sensor and an acceleration sensor. The microphone 2008 converts sound inputted to the intelligent telephone 2000 to an audio signal. The input device 2009 comprises for example a touch sensor configured to detect a touch on a screen of the display device 2010, a keypad, a keyboard, buttons or switches, and receives an operation or information inputted from a user. The display device 2010 comprises a screen (such as a Liquid Crystal Display (LCD) and an Organic Light-Emitting Diode (OLED) display), and displays an output image of the intelligent telephone 2000. The speaker 2011 converts the audio signal outputted from the intelligent telephone 2000 to sound.

The wireless communication interface 2012 supports any cellular communication scheme (such as LTE and LTE-Advanced), and executes wireless communication. The wireless communication interface 2012 generally may comprise for example a BB processor 2013 and an RF circuit 2014. The BB processor 2013 may execute for example coding/decoding, modulation/demodulation and multiplexing/demultiplexing, and execute various types of signal processing for wireless communication. Meanwhile, the RF circuit 2014 may comprise for example a frequency mixer, a filter and an amplifier, and transmit and receive a wireless signal via the antenna 2016. The wireless communication interface 2012 may be a chip module on which a BB processor 2013 and an RF circuit 2014 are integrated. As shown in FIG. 20, the wireless communication interface 2012 may comprise a plurality of BB processors 2013 and a plurality of RF circuits 2014. Although FIG. 20 shows an example in which the wireless communication interface 2012 comprises a plurality of BB processors 2013 and a plurality of RF circuits 2014, the wireless communication interface 2012 may also comprise a single BB processor 2013 or a single RF circuit 2014.

In addition, besides the cellular communication schemes, the wireless communication interface 2012 may support other types of wireless communication schemes, such as a Device-to-Device (D2D) communication scheme, a short range wireless communication scheme, a near field communication scheme and a wireless Local Area Network (LAN) scheme. In this case, the wireless communication interface 2012 may comprise a BB processor 2013 and an RF circuit 2014 for each wireless communication scheme.

Each of the antenna switches 2015 switches a connection destination of the antenna 2016 between a plurality of circuits included in the wireless communication interface 2012 (for example, circuits for different wireless communication schemes).

Each of the antennas 2016 comprises a single or more antenna elements (such as a plurality of antenna elements included in an MIMO antenna), and is used for the communication interface 2012 to transmit and receive a wireless signal. As shown in FIG. 20, the intelligent telephone 2000 may comprise a plurality of antennas 2016. Although FIG. 20 shows an example in which the intelligent telephone 2000 comprises a plurality of antennas 2016, the intelligent telephone 2000 may also comprise a single antenna 2016.

In addition, the intelligent telephone 2000 may comprise an antenna 2016 for each wireless communication scheme. In this case, the antenna switch 2015 may be omitted from the configuration of the intelligent telephone 2000.

The bus 2017 connects the processor 2001, the memory 2002, the storage device 2003, the external connection interface 2004, the image pick-up device 2006, the sensor 2007, the microphone 2008, the input device 2009, the display device 2010, the speaker 2011, the wireless communication interface 2012 and the auxiliary controller 2019 to each other. The battery 2018 supplies electric power to the respective blocks of the intelligent telephone 2000 as shown in FIG. 20 via feeder lines which are partially shown as dashed lines in the figure. The auxiliary controller 2019 for example manipulates the least necessary function of the intelligent telephone 2000 in a sleep mode.

In the intelligent telephone 2000 as shown in FIG. 20, the first interface, the second interface and the communication interface in the foregoing electronic devices 200 and 1000 may be realized by the wireless communication interface 2012. At least part of the functions of the measuring unit, the determining unit and the generating unit may also be implemented by the processor 2001 or the auxiliary controller 2019.

Second Application Example

Figure 21:
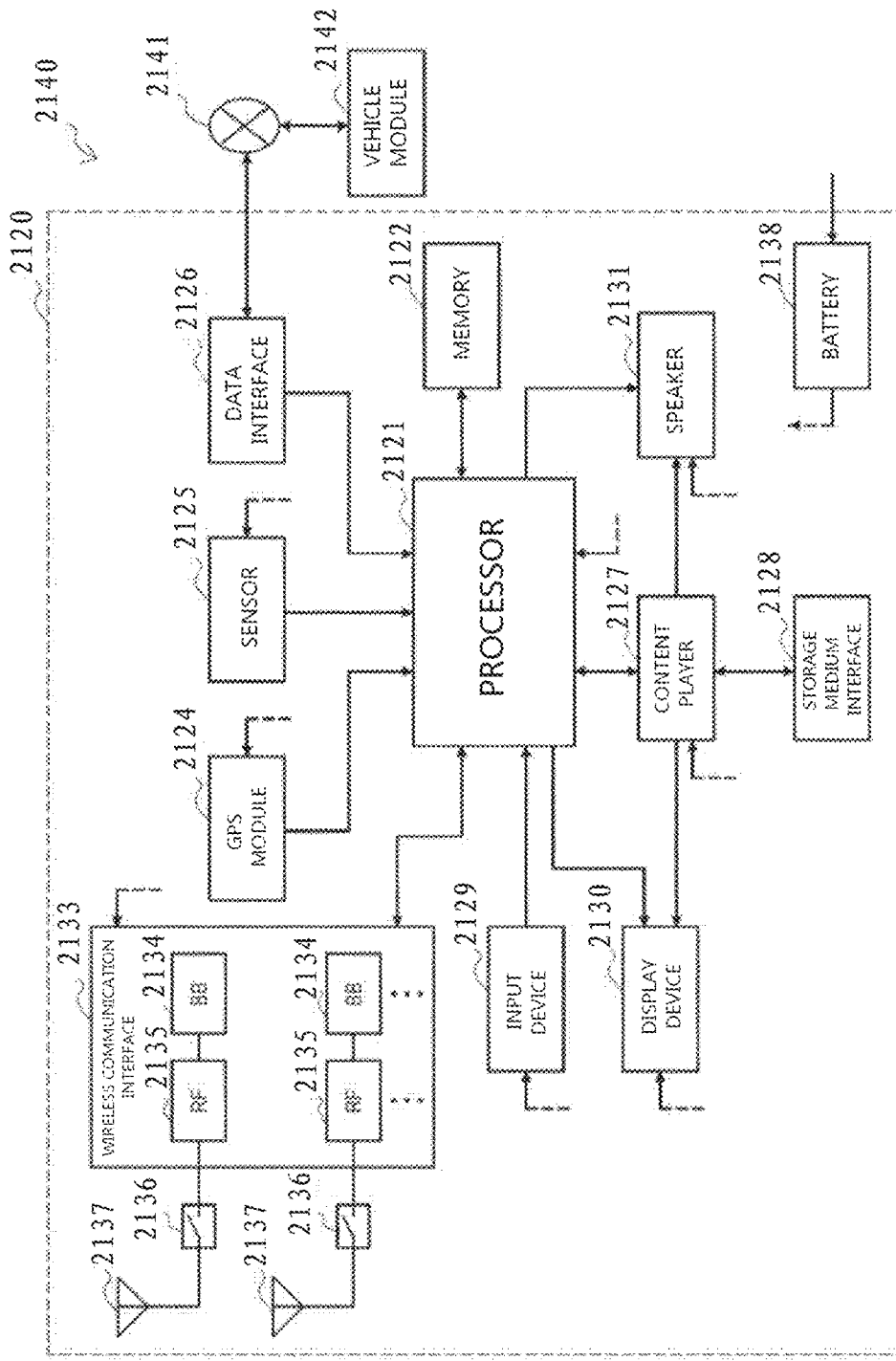
FIG. 21 is a block diagram showing an example of schematic configuration of an automobile navigation device to which the technology according to the present disclosure can be applied.

FIG. 21 is a block diagram showing an example of schematic configuration of an automobile navigation device 2120 to which the technology according to the present disclosure can be applied. The automobile navigation device 2120 comprises a processor 2121, a memory 2122, a Global Positioning system (GPS) module 2124, a sensor 2125, a data interference 2126, a content player 2127, a storage medium interface 2128, an input device 2129, a display device 2130, a speaker 2131, a wireless communication interface 2133, one or more antenna switches 2136, one or more antennas 2137, and a battery 2138.

The processor 2121 may be for example a CPU or a SoC, and controls a navigation function and additional functions of the automobile navigation device 2120. The memory 2122 comprises an RAM and an ROM, and stores data and programs executed by the processor 2121.

The GPS module 2124 measures a position (such as longitude, latitude and height) of the automobile navigation device 2120 by using a GPS signal received from a GPS satellite. The sensor 2125 may comprise a group of sensors, such as a gyro sensor, a geomagnetic sensor and an air pressure sensor. The data interface 2126 is connected to for example an in-vehicle network 2141 via a terminal which is not shown, and acquires data (such as vehicle speed data) generated by a vehicle.

The content player 2127 reproduces content stored in a storage medium (such as a CD and a DCD). The storage medium is inserted in the storage medium interface 2128. The input device 2129 comprises for example a touch sensor configured to detect a touch on a screen of the display device 2130, buttons or switches, and receives an operation or information inputted from a user. The display device 2130 comprises a screen such as an LCD or an OLED display, and displays an image of the navigation function or the reproduced content. The speaker 2131 outputs sound of the navigation function or the reproduced content.

The wireless communication interface 2133 supports any cellular communication scheme (such as LTE and LTE-Advanced), and executes wireless communication. The wireless communication interface 2133 generally may comprise for example a BB processor 2134 and an RF circuit 2135. The BB processor 2134 may execute for example coding/decoding, modulation/demodulation and multiplexing/demultiplexing, and execute various types of signal processing for wireless communication. Meanwhile, the RF circuit 2135 may comprise for example a frequency mixer, a filter and an amplifier, and transmit and receive a wireless signal via the antenna 2137. The wireless communication interface 2133 may also be a chip module on which a BB processor 2134 and an RF circuit 2135 are integrated. As shown in FIG. 21, the wireless communication interface 2133 may comprise a plurality of BB processors 2134 and a plurality of RF circuits 2135. Although FIG. 21 shows an example in which the wireless communication interface 2133 comprises a plurality of BB processors 2134 and a plurality of RF circuits 2135, the wireless communication interface 2133 may also comprise a single BB processor 2134 or a single RF circuit 2135.

In addition, besides the cellular communication schemes, the wireless communication interface 2133 may support other types of wireless communication schemes, such as a Device-to-Device (D2D) communication scheme, a short range wireless communication scheme, a near field communication scheme and a wireless LAN scheme. In this case, for each wireless communication scheme, the wireless communication interface 2133 may comprise a BB processor 2134 and an RF circuit 2235.

Each of the antenna switches 2136 switches a connection destination of the antenna 2137 between a plurality of circuits included in the wireless communication interface 2133 (for example, circuits for different wireless communication schemes).

Each of the antennas 2137 comprises a single or more antenna elements (such as a plurality of antenna elements included in an MIMO antenna), and is used for the communication interface 2133 to transmit and receive a wireless signal. As shown in FIG. 21, the automobile navigation device 2120 may comprise a plurality of antennas 2137. Although FIG. 21 shows an example in which the automobile navigation device 2120 comprises a plurality of antennas 2137, the automobile navigation device 2120 may also comprise a single antenna 2137.

In addition, the automobile navigation device 2120 may comprise an antenna 2137 for each wireless communication scheme. In this case, the antenna switch 2136 may be omitted from the configuration of the automobile navigation device 2120.

The battery 2138 supplies electric power to the respective blocks of the automobile navigation device 2120 as shown in FIG. 21 via feeder lines which are partially shown as dashed lines in the figure. The battery 2138 accumulates the electric power supplied from the vehicle.

In the automobile navigation device 2120 as shown in FIG. 21, the first interface, the second interface and the communication interface in the foregoing electronic devices 200 and 1000 may be realized by the wireless communication interface 2133. At least part of the functions of the measuring unit, the determining unit and the generating unit may also be implemented by the processor 2121.

The technology of the disclosure may also be realized as an in-vehicle system (or vehicle) 2140 comprising one or more of the following blocks: the automobile navigation device 2120, the in-vehicle network 2141 and a vehicle module 2142. The vehicle module 2142 generates vehicle data (such as vehicle speed, engine speed and fault information), and outputs the generated data to the in-vehicle network 2141.

Preferred embodiments of the present disclosure have been described above with reference to the drawings. However, the disclosure of course is not limited to the above examples. Those skilled in the art can obtain various alterations and modifications within the scope of the appended claims, and it should be understood that these alterations and modifications naturally will fall within the technical scope of the disclosure.

For example, in the foregoing embodiments, a plurality of functions incorporated in one unit may be implemented by separate devices. Alternatively, in the foregoing embodiments, a plurality of functions implemented by a plurality of units may be implemented by separate devices, respectively. In addition, one of the foregoing functions may be implemented by a plurality of units. Undoubtedly, such configuration is included within the technical scope of the disclosure.

In the specification, the steps described in the flowcharts not only include processing executed in the order according to a time sequence but also include processing executed in parallel or separately but not necessarily according to a time sequence. In addition, even if in steps in which processing is executed according to a time sequence, the order undoubtedly still can be appropriately changed.

Although the present disclosure and the advantages thereof have been described in detail, it should be understood that various alterations, substitutions or transformations may be made without departing from the spirit and the scope of the present disclosure as defined by the appended claims. Moreover, terms "include" and "comprise" or any other variants thereof in the embodiments of the present disclosure are intended to cover non-exclusive inclusion, such that a process, a method, an article or an apparatus including a series of elements not only includes those elements but also includes other elements not explicitly listed or but also includes elements intrinsic to such a process, method, article or apparatus. In the absence of more limitations, elements defined by expression "including one . . . " do not exclude further existence of other identical elements in a process, a method, an article or an apparatus including the elements.

The invention claimed is:

1. An electronic device at user equipment end in wireless communication, the electronic device comprising a processing circuit configured to:
    measure downlink channel qualities of a serving base station of the user equipment and neighboring base stations;
    determine, based on the measured downlink channel qualities, a first base station set from the serving base station and the neighboring base stations; and
    determine the first base station set based on variation trends and amplitudes of the measured downlink channel qualities,
    wherein the first base station set indicates a set of base stations to broadcast or multicast data information.

2. The electronic device according to claim 1, wherein the wireless communication comprises vehicle communication.

3. The electronic device according to claim 1, wherein the processing circuit is further configured to determine the first base station set based on distances among base stations corresponding to a first predetermined number of downlink channel qualities, variation trends of the first predetermined number of downlink channel qualities are increment and the amplitudes that rank first.

4. The electronic device according to claim 1, wherein the processing circuit is further configured to determine the first base station set based on an effective range of the data information that is related to at least one of a category of the data information and a movement speed of the user equipment.

5. The electronic device according to claim 1, wherein the processing circuit is further configured to determine, based on the measured downlink channel qualities, a second base station set from the serving base station and the neighboring base stations, the second base station set indicating a set of base stations to cache the data information in advance.

6. The electronic device according to claim 1, wherein the processing circuit is further configured to generate a report comprising the data information and the first base station set to be sent to the serving base station.

7. The electronic device according to claim 1, wherein the electronic device further operates as the user equipment and further comprises:
    a first interface configured to support cellular communication.

8. The electronic device according to claim 7, wherein the electronic device sends a priority indication indicating a priority of the data information to the serving base station via the first interface.

9. The electronic device according to claim 8, further comprising:
    a second interface configured to support device to device communication.

10. The electronic device according to claim 9, wherein the electronic device receives, via the first interface, a group identifier sent by the serving base station based on the priority indication, and broadcasts the group identifier via the second interface.

11. An electronic device at base station end in wireless communication, the electronic device comprising a processing circuit configured to:
    determine data information and a first base station set according to a report from a user equipment served by the base station so as to send the data information to each base station in the first base station set, and
    determine, according to a priority indication indicating a priority of the data information received from the user equipment, a group identifier for the user equipment to be sent to the user equipment,
    wherein the first base station set is determined by the user equipment according to measured downlink channel qualities for the base station and neighboring base stations, and indicates a set of base stations to broadcast or multicast the data information.

12. The electronic device according to claim 11, wherein the processing circuit is further configured to determine a second base station set according to the report so as to send the data information to each base station in the second base station set, the second base station set being determined by the user equipment according to the measured downlink channel qualities for the base station and the neighboring base stations and indicating a set of base stations to cache the data information in advance.

13. The electronic device according to claim 12, wherein the processing circuit is further configured to determine, according to the report, an identifier indicating whether a specific base station belongs to the first base station set or the second base station set so as to send the identifier together with the data information to the specific base station.

14. The electronic device according to claim 13, wherein the processing circuit is further configured to generate, when it is determined that a certain base station in the second base station set becomes a base station in the first base station set, an identifier indicating that the certain base station belongs to the first base station set to be sent to the certain base station.

15. The electronic device according to claim 11, wherein the processing circuit is further configured to scramble the data information with the group identifier to be sent to each base station in the first base station set.

16. The electronic device according to claim 11, wherein the processing circuit is further configured so that the group identifier and the data information are sent to each base station in the first base station set together, so that each base station in the first base station set scrambles the data information with the group identifier and then broadcasts or multicasts the same.

17. The electronic device according to claim 11, wherein the electronic device further operates as the base station and further comprises:
   a communication interface configured to perform transceiving operations.

* * * * *